US011537424B2

(12) United States Patent
Pashenkov et al.

(10) Patent No.: US 11,537,424 B2
(45) Date of Patent: Dec. 27, 2022

(54) SCALABLE AND SECURE CONTAINERS

(71) Applicant: Kontain Inc., Los Altos, CA (US)

(72) Inventors: Serge Pashenkov, Los Altos, CA (US); Mark Sterin, Mountain View, CA (US)

(73) Assignee: KONTAIN INC., Los Altos, CA (US)

( * ) Notice: Subject to any disclaimer, the term of this patent is extended or adjusted under 35 U.S.C. 154(b) by 180 days.

(21) Appl. No.: 16/870,459

(22) Filed: May 8, 2020

(65) Prior Publication Data
US 2020/0356400 A1 Nov. 12, 2020

Related U.S. Application Data

(60) Provisional application No. 62/846,369, filed on May 10, 2019.

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45583* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 9,477,461 B1 * | 10/2016 | Korotaev | ................ | G06F 8/656 |
| 9,645,847 B1 * | 5/2017 | Roth | ........................ | G06F 9/461 |
| 10,628,177 B1 * | 4/2020 | Eyberg | ................ | G06F 9/44521 |
| 2007/0028238 A1 * | 2/2007 | Bennett | ............... | G06F 9/45558 718/1 |
| 2009/0113110 A1 * | 4/2009 | Chen | .................... | G06F 9/45558 718/1 |
| 2010/0223616 A1 * | 9/2010 | De | ........................ | G06F 9/5077 718/100 |

(Continued)

OTHER PUBLICATIONS

Anonymous, "Docker (software)," Wikipedia.org, Jul. 30, 2013, retrieved via https://en.wikipedia.org/Docker_(software) on Sep. 24, 2020, 7 pgs.

(Continued)

*Primary Examiner* — Wynuel S Aquino
(74) *Attorney, Agent, or Firm* — Patent Law Works LLP

(57) ABSTRACT

A system and method for dynamically configuring a virtual machine to accommodate requests of a microservice application program and executing the microservice application program in the virtual machine with optimal computing resources are provided. The method includes: creating a dynamically configurable virtual machine including a first virtual CPU, receiving microservice application code, linking the microservice application code to generate executable code, determining and assigning memory in the dynamically configurable virtual machine for executing the executable code, executing the executable code using the dynamically configurable virtual machine, determining whether the dynamically configurable virtual machine requires reconfiguration and performing reconfiguration of the dynamically configurable virtual machine responsive to determining that the virtual machine requires reconfiguration.

23 Claims, 15 Drawing Sheets

(56) References Cited

U.S. PATENT DOCUMENTS

| | | | |
|---|---|---|---|
| 2015/0205587 A1 | 7/2015 | Bates et al. | |
| 2015/0370544 A1* | 12/2015 | Santry | G06F 8/41 |
| | | | 717/145 |
| 2016/0092250 A1 | 3/2016 | Wagner et al. | |
| 2016/0188452 A1* | 6/2016 | Almasi | G06F 12/109 |
| | | | 711/6 |
| 2016/0274929 A1* | 9/2016 | King | G06F 9/5077 |
| 2017/0060437 A1* | 3/2017 | Schuster | G06F 3/0652 |
| 2018/0013579 A1* | 1/2018 | Fairweather | H04L 12/40032 |
| 2018/0129526 A1 | 5/2018 | Zheng | |
| 2018/0225227 A1* | 8/2018 | Chari | G06F 12/1458 |
| 2018/0267785 A1 | 9/2018 | Holman et al. | |
| 2018/0336057 A1* | 11/2018 | Yamamoto | G06F 11/0751 |
| 2018/0349168 A1* | 12/2018 | Ahmed | G06F 11/3433 |
| 2019/0079734 A1* | 3/2019 | Kadam | G06F 9/44521 |
| 2019/0171473 A1* | 6/2019 | Hildenbrand | G06F 9/45558 |
| 2020/0327217 A1* | 10/2020 | Soryal | G06F 8/54 |

OTHER PUBLICATIONS

Anonymous, "Linux," Wikipedia.org, Nov. 20, 2001, retrieved via https://en.wikipedia.org/Linux on Sep. 24, 2020, 37 pgs.

Anonymous, "Virtual machine," Wikipedia.org, Sep. 29, 2001, retrieved via https://en.wikipedia.org/Virtual_machine on Sep. 24, 2020, 7 pgs.

Bjuhr, "Dynamic Configuration of a Relocatable Driver and Code Generator for Continuous Deep Analytics," Degree Project in Information and Communication Technology, KTH Royal Institute of Technology School of Architecture and the Built Environment, Jun. 24, 2018, Stockholm, Sweden, 61 pgs.

International Search Report and Written Opinion for International Application No. PCT/US2020/032176, dated Jul. 29, 2020, 23 pgs.

Proto.IO, Inc., "Containers," date unknown, retrieved via https://support.proto.io/hc/en-us/articles/219602088-Containers on Sep. 24, 2020, 8 pgs.

\* cited by examiner

SCALABLE AND SECURE CONTAINERS

FIELD OF THE INVENTION

The present disclosure relates to container-based technology. In particular, the present disclosure relates to providing virtual machine level isolation of individual microservice instances in containers. More particularly, the present disclosure relates to dynamically configuring a virtual machine to accommodate requests of a microservice application program and executing the microservice application program in the virtual machine with optimized computing resources.

BACKGROUND

Microservices are an essential paradigm of cloud native computing. Each microservice is developed by a small team, provides its own well defined, maintainable, and testable functionality. It is deployable independently from the rest of the application. Each microservice is designed to scale independently on demand through the spawning of an arbitrary number of instances.

Linux provides an extremely rich set of primitives and facilities including support for sophisticated shared in-memory data structures, inter-process communications, persistent shared data in file system hierarchies, and so forth. These primitives and facilities are instrumental for large monolithic applications. In contrast, microservices by their nature are ill-suited to use these facilities of Linux. In fact, using these facilities is problematic because it limits scalability, testability, and deployability of web-scale applications. Instead, microservices are simple components, interacting via well defined, usually RESTful, network APIs.

Existing containers, for example, Docker® containers, are standard units of software that package up code and all its dependencies so the application runs quickly and reliably from one computing environment to another. Containers provide technological support for microservices—each instance of a microservice runs in its own container. Containers provide an illusion of full isolation, so each is under the impression that it is the sole occupant of the host computing environment.

But for all their benefits, existing containers have significant shortcomings. They are not nearly as well isolated from each other as the current gold standard, the virtual machine. They usually take one to several seconds to start, which creates performance problems for many cloud-native applications. Also, they occupy gigabytes of memory for megabyte microservices, so the cost of executing them at scale is high.

SUMMARY

The techniques introduced herein overcome the deficiencies and limitations of the prior art, at least in part, by providing a container that supports virtual machine level isolation of individual microservice instances, combined with quick startup time and runtime efficiency of regular system processes, with an additional benefit of smaller and immutable executable code artifacts.

The container solution described herein includes a dynamically configurable virtual machine that executes specific code. The dynamically configurable virtual machine is configured by the code executing inside and adapts to the code. The dynamically configurable virtual machine does not emulate the full set of hardware of an existing physical machine, unlike the existing prior art virtual machines. The virtual machine of the present disclosure does not need to mimic the full capability of a general purpose computer, or include all facilities that are implemented in a traditional general purpose operating system, and therefore, the complexity and size of the virtual machine, as well as the requisite computer and network resources for executing it, are significantly reduced.

According to one aspect of the subject matter described in this disclosure, a product container includes a first container library including a collection of library functions; and a first dynamically configurable virtual machine having a first virtual CPU and memory, the first dynamically configurable virtual machine coupled to access the first library container, the first dynamically configurable virtual machine adapted to run executable code and determine whether reconfiguration is required from executing the executable code.

The dynamically configurable virtual machine of the present disclosure starts with minimal memory to store the executable code and a single virtual Central Processing Unit (CPU). As the code executes and requests additional hardware, the dynamically configurable virtual machine adds or allocates memory and virtual processors. When the request changes, the dynamically configurable virtual machine may also remove or deallocate the memory and virtual processors. Therefore, the dynamically configurable virtual machine allows dynamic configuration that is different from the rigid memory and processor configuration in existing prior art virtual machines. As a result, the dynamically configurable virtual machine reduces startup time as compared to the existing prior art virtual machines because the dynamically configurable virtual machine is simplified (doesn't emulate any unnecessary hardware other than a single CPU and memory) and adapted to the needs of executing microservices. The dynamically configurable virtual machine also increases runtime efficiency because it can be configured dynamically. The dynamically configurable virtual machine supports static linking, dynamic linking, and both static & dynamic linking, which allows compact runtime libraries as well as small and immutable executable code.

In general, another aspect of the subject matter described in this disclosure includes a method comprising creating, by one or more processors, a dynamically configurable virtual machine including a first virtual CPU; receiving, by the one or more processors, microservice application code; linking, by the one or more processors, the microservice application code to generate executable code; determining and assigning, by the one or more processors, memory in the dynamically configurable virtual machine for executing the executable code; executing the executable code using the dynamically configurable virtual machine; determining whether the dynamically configurable virtual machine requires reconfiguration; and performing reconfiguration of the dynamically configurable virtual machine responsive to determining that, the virtual machine requires reconfiguration.

Other implementations of one or more of these aspects include corresponding systems, apparatus, and computer programs, configured to perform the actions of the methods, encoded on computer storage devices.

These and other implementations may each optionally include one or more of the following features. For instance, the method further comprises performing reconfiguration on demand, where on demand is responsive to execution of the executable code by the dynamically configurable virtual machine. Other features include linking the microservice application code to generate the executable code by identifying a link from the microservice application code to a standard system library; replacing the identified link with a replacement link from the microservice application code to the container library; and generating the executable code based on the replacement link. In another instance, features may also include that determining whether the virtual machine needs more CPU power, and activating an additional virtual CPU responsive to determining that the virtual machine needs more CPU power. Activating the additional virtual CPU may include determining whether an inactive virtual CPU is available; preparing and activating the inactive virtual CPU as a replacement virtual CPU if it is determined that the inactive virtual CPU is available; creating the additional virtual CPU if it is determined that no inactive virtual CPU is available; configuring a page map level 4 hierarchy for the additional virtual CPU; and configuring a stack for the additional virtual CPU. For example, the method may also include determining whether the virtual machine needs less CPU power, and deactivating the additional virtual CPU responsive to determining that the virtual machine needs less CPU power. Deactivating the additional virtual CPU may include marking the additional virtual CPU as inactive; and placing the thread in a sleep status waiting for possible future re-activation in an event of a future need for an additional virtual CPU. In still other instances, the method may also include determining whether the virtual machine needs more memory, and allocating additional memory responsive to determining that the virtual machine needs more memory. Allocating the additional memory includes determining a size of memory needed for executing the executable code; and adding the additional memory to the virtual machine by linearly mapping a number of virtual addressees to a number of physical addresses based on the determined size of memory needed for executing the executable code. In another example, features may also include determining whether the virtual machine needs less memory, and deallocating a portion of the additional memory responsive to determining that the virtual machine needs less memory. Deallocating the memory includes determining the additional memory allocated for the execution of the executable code by identifying linear mappings to physical addresses; and deallocating the additional memory used by the executable code from the virtual machine by removing the linear mappings. In yet other instances, the method may also include determining whether the executable code invokes a hypercall; and responsive to determining that the executable code invokes a hypercall, decoding one or more parameters of the hypercall; performing the hypercall with the virtual machine based on the one or more parameters; and resuming the execution of the executable code. In other examples, features may also include that the method further includes identifying program object files; analyzing the object files to generate a list of function names that may be called in the course of executing the executable code; building a table that maps function names in the list to addresses; and constructing the container library based on linking the program object files and function names.

The features and advantages described herein are not all-inclusive and many additional features and advantages will be apparent in view of the figures and description. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes systems and methods for dynamically configuring a virtual machine to accommodate requests of a microservice application program and executing the microservice application program in the virtual machine with optimized computing resources. In the following descriptions, for purpose of explanation, numerous specific details are set forth in order to provide a thorough understanding of the present disclosure. However, it should be noted that the present disclosure might be practiced without these specific details.

The techniques introduced herein describe a container 102 that targets modern server-side applications that are built using a microservice architecture, i.e., applications structured as a set of loosely coupled and collaborating microservices.

Figure 1A:
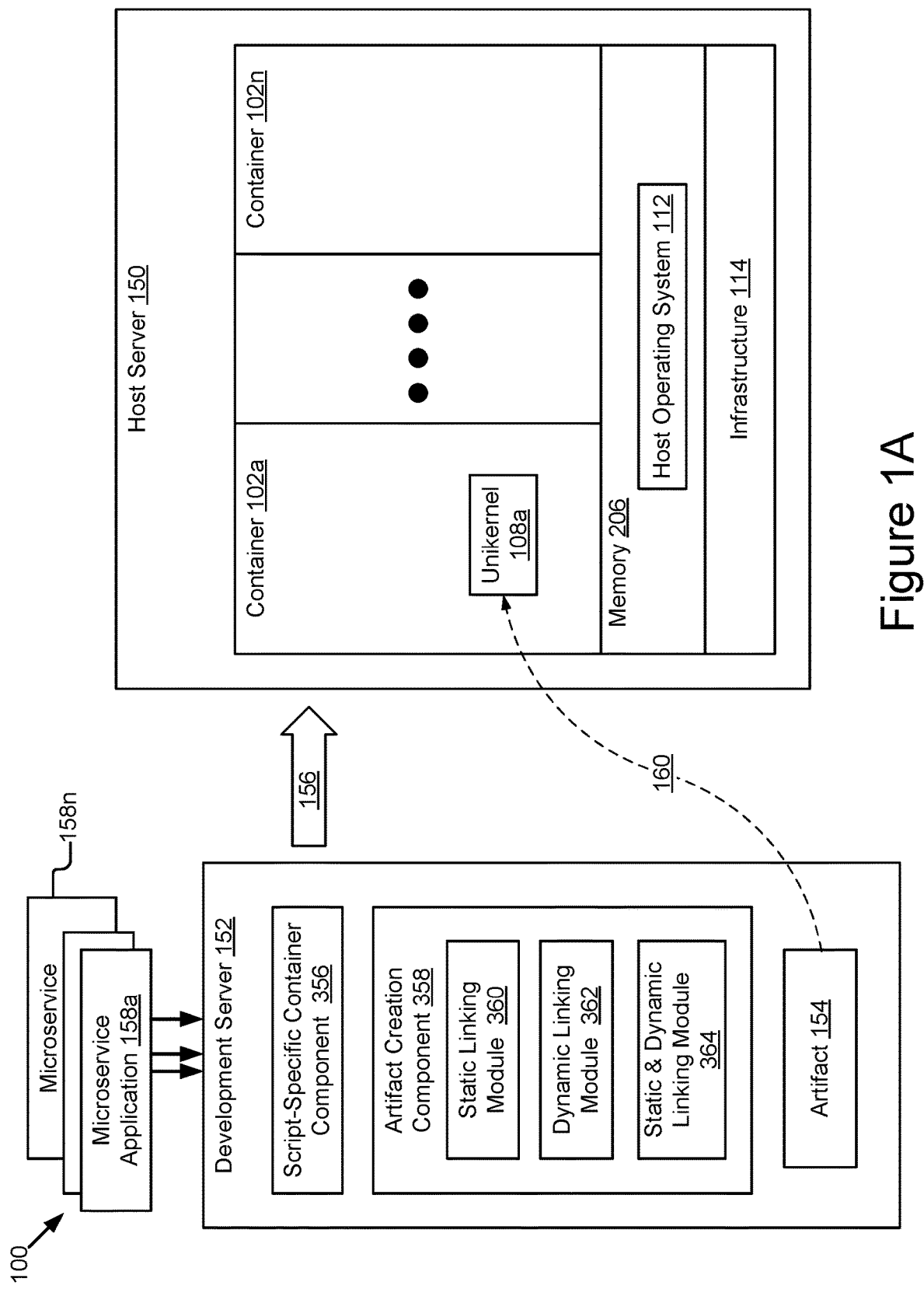
FIG. 1A is a block diagram of an example system including a development server and a host server in accordance with the present disclosure.

FIG. 1A is a block diagram of one implementation of an example system 100 including a host server 150, a development server 152 and one or more microservice applications 158*a*-158*n*. The one or more microservice applications 158*a*-158*n* are coupled to the development server 152 and the development server 152 is in turn coupled to the host server 150. The development server 152 interacts and communicates with the one or more microservice applications 158*a*-158*n* to generate a corresponding container 102. In some implementations, a different container 102 is created for each different microservice application 158*a*-158*n*. The development server 152 creates the one or more containers 102 and then provides or installs them on the host server 150 for operation and execution as represented by line 156. Once the one or more containers 102 are installed and operational on the host server 150, the one or more microservice applications 158*a*-158*n* can execute their operations directly with their corresponding container 102.

Development Server 152

As shown in FIG. 1A, the development server 152 includes a script-specific container component 356 and an artifact creation component 358. The artifact creation component 358 further includes a static linking module 360, a dynamic linking module 362, and a static & dynamic linking module 364. In some implementations, the development server 152 also includes other components or modules (not shown in FIG. 1A) but as described below for creating the container 102, the virtual machine 104 and the artifact 108 and for installing them on the host server 150. In different implementations, this can be done automatically through the execution of software on the development server 152 or can be done manually by a programmer interacting with the development server 152.

The script-specific container component 356 is used to create the container 102 that will be installed and executed on the host server 150. The script-specific container component 356 defines the container 102 and the virtual machine 104, and cooperates with the artifact creation component 358 to create an artifact 108 including user code 110 and a container library 106 that will be part of the container 102. The container 102 will be optimized to only include the code and references needed for a specific microservice application as is described below. In some implementations, the script-specific container component 356 is also used to handle functionalities implemented in a scripting language, such as Python or JavaScript. This is particularly useful since a significant portion of cloud native applications (e.g., microservice applications 158*a*-158*n*) are implemented in a scripting language. In order to support the applications using a scripting language, the script-specific container component 356 develops a set of pre-created specialized containers. The guest code in these containers implements the scripted language interpreter, potentially offloading some of the processing to the virtual machine program via payload specific hypercalls. As a result, the virtual machine 104 itself may be specialized for the scripted language that it supports. The script-specific container component 356 also cooperates with the artifact creation component 358 to create user specific artifacts 108 as part of creating the container 102. In some implementations, the script-specific container component 356 automatically combines the pre-created container with user's container image to obtain the user's specific scripted language container.

The artifact creation component 358 is responsible for creating an artifact 154 for microservice application code by linking user code 110 to the container library 106. The artifact 154 is the executable code that is produced by the development server 152 and will be loaded 160 on a virtual machine 104 of a container 102 operating on the host server 150. Once the artifact 154 has been loaded and executed in the virtual machine 104, it executes as a unikernel 108. The terms artifact 154 and unikernel 108 are used by some skilled in the art as meaning the same thing and interchangeably. That usage can also be used here unless specifically distinguished as noted above and shown in FIG. 1A. Whether it is referred to herein as an "artifact" or a "unikernel," the present disclosure is particularly advantageous because both are self-contained code that require no traditional operating system (OS) kernel to execute. In other words, the artifact 154 or the unikernel 108 are executable code that can execute natively on the virtual machine 104 without the need for a separate operating system. The artifact 154 and the unikernel 108 each include all the application code and operating system functions required by the application code. Still more particularly, the present disclosure is particularly advantageous because, in some implementations, the artifact 154 and unikernel 108 are optimized as will be described below to include only a fraction of the operating system functions, specifically those operating system functions used by the application code.

The artifact creation component 358 creates the artifact 154 based on static linking, dynamic linking, or both. In some implementations, the artifact creation component 358 includes a static linking module 360, a dynamic linking module 362, and a static & dynamic linking module 364 as illustrated in FIG. 1A.

In some implementations, the static linking module 360 may access the microservice object code, i.e., the compiler output, to implement static linking. The normal process of building a statically-linked guest program is to directly access the microservice object code and link the microservice object code with standard system libraries, specifically libc. The resulting executable is a standard Linux executable.

One particular advantage of the present disclosure is that artifact creation component 358, in some implementations, copies the existing object code of the microservice application 158 and adds it to the artifact 154 being created with no modification. The artifact creation component 358 does not even require access to the source code of the microservice application 158. This makes it possible to create artifacts 154 without any source code modifications whatsoever, so existing code can be used with no additional effort or impact on standard development practices. This is in contrast to existing prior art unikernels where the payload code is required to be re-written in an exotic language such as OCaml, or in other cases, the payload code is required to a be dialect of C/C++ with unikernel-specific libraries. Either prior art approach would negate the present disclosure's approach that enables adoption of existing code. Forcing users to develop new code, and requiring unusual expertise in exotic languages, are counter to the design goals of the present disclosure.

In order to produce the artifact 154 for the virtual machine 104, the static linking module 360 statically links the guest microservice object code with the runtime container library 106 (which is implemented as an archive of object files) instead of with standard system libraries. In this way, the static linking module 360 generates the resulting executable that is customized tor the virtual machine monitor 302 to load and run on the virtual machine 104. The statically linked artifact 154 is to be used in the virtual machine 104, and once loaded on the virtual machine 104 and executed is a unikernel 108. As noted above, the unikernel 108 of the present disclosure is particularly advantageous because it is executable code that can execute natively on the virtual machine 104 without the need for a separate operating system and is optimized to include only those operating system functions used by the application code. Using static linking, the static linking module 360 combines all the necessary code, i.e., all the functions on all possible execution paths, as well as all the initialized data into a single ELF executable file. This ELF file is then loaded to the memory of the virtual machine 104 only once when the program launches. As the logic of the payload requires, the data may change but the code itself would not change after being loaded.

Host Server 150

FIG. 1A also shows the host server 150 including one or more example containers 102a-102n. As illustrated, the host server 150 may include one or more containers 102a-102n, a memory 206 storing a host operating system 112, and infrastructure 114. It is to be understood that, although FIG. 1A illustrates only one host operating system 112, and infrastructure 114, the host server 150 may include multiple host operating systems 112, and additional infrastructure 114.

The host operating system 112 and infrastructure 114 is part of a host server 150 on which the container 102 resides. The host server 150 may be any computing device that includes hardware, software, and/or firmware that support the functionality described herein. For instance, the host operating system 112 is a Linux system operating on a Linux server 150, and the infrastructure 114 includes physical and virtual resources that support the flow, storage, processing and analysis of data in the Linux system. The host server 150 will be described in more detail with reference to FIG. 2 below.

Figure 1B:
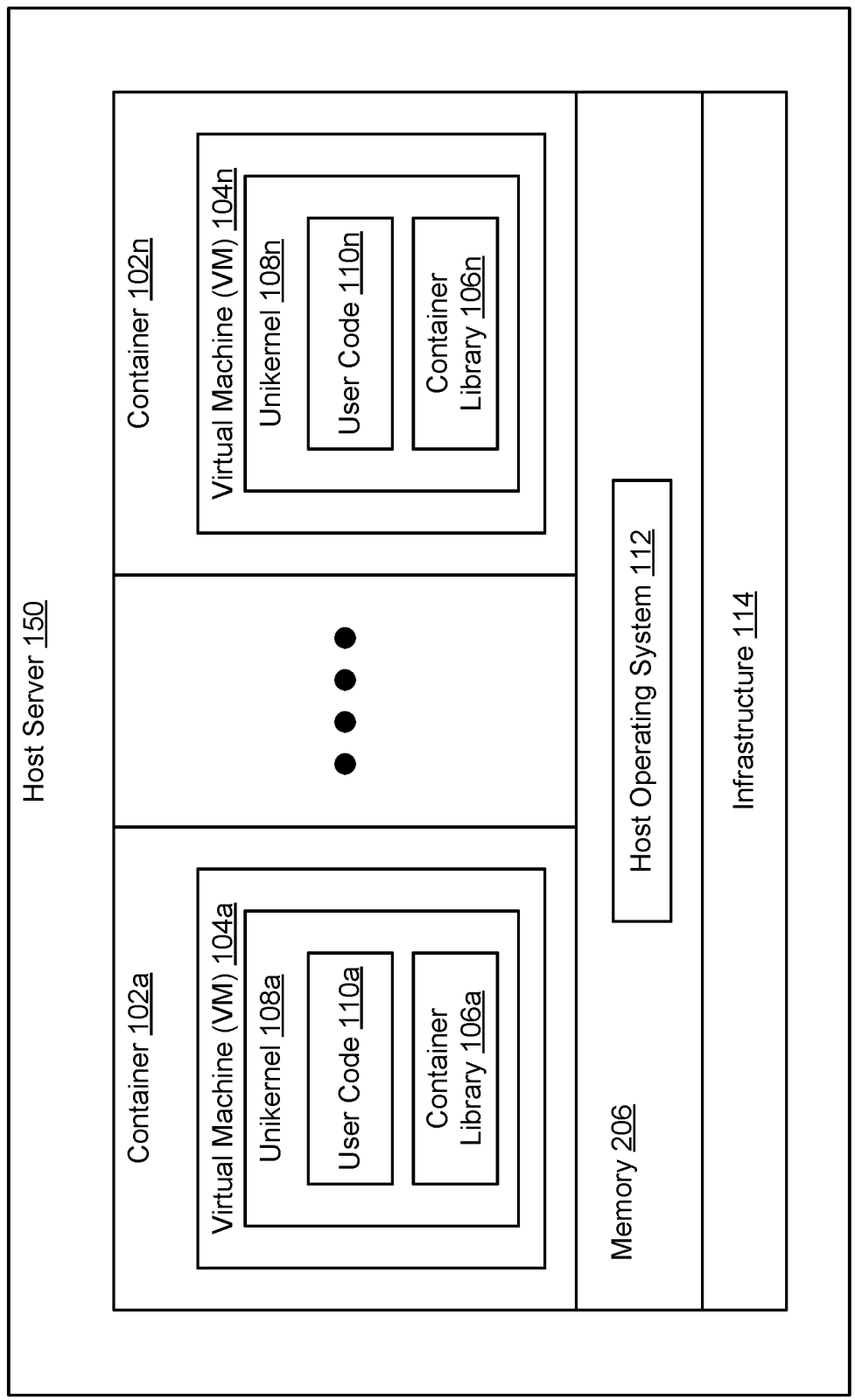
FIG. 1B is a block diagram of one implementation of the host server including one or more containers in accordance with the present disclosure.

Referring now also to FIG. 1B, the host server 150, in particular, the containers 102a-102n are shown in more detail. In this implementation, each container 102a-102n includes a virtual machine 104 and a unikernel 108 having user code 110 and a container library 106. For example, container 102a includes virtual machine 104a, unikernel 108a, user code 110a and container library 106a. Similarly, container 102n includes virtual machine 104n, unikernel 108n, user code 110n and container library 106n. From FIG. 1B, it can be understood that the host server 150 may have any number of containers 102 from 1 to n. As noted above, each of the containers 102a-102n preferably correspond to different microcode applications 158a-158n. In some implementations, each microservice application 158a-158n is converted to a unikernel 108a-108n that runs inside its own container 102a-102n, so there are as many containers 102a-102n as there are microservice applications 158a-158n. In the illustrated embodiment, each container 102a-102n is implemented as one or more virtual machines 104a ... 104n, and one or more one or more artifacts 108a ... 108n for processing. The virtual machines 104a ... 104n, one or more one or more artifacts 108a ... 108n, one or more user code 110a-110n and container libraries 106a-106n may be collectively referred herein as virtual machine 104, container library 106, unikernel 108, and user code 110, respectively.

The container 102 includes the unikernel 108 including user code 110 and a container library 106. The microservice application code 158 is linked with the container library 106 to generate the unikernel 108 as has been described above. Linking is done during build time, post-compilation, as part of container creation and preparation. The artifact 154 is a product of some process (linking and copying in this case) applied to the object code as has been described above. In some implementations, the container preparation process may provide facilities to link the microservice object code with runtime libraries. Once the artifact 154 is generated, the container 102 loads the artifact 154 in the virtual machine 104 where it executes as the unikernel 108. In some implementations, the virtual machine 104 includes no code other than the loaded unikernel 108. The virtual machine 104 runs the loaded code as a standalone program.

It should be noted that the implementation of the container 102 is more flexible, accurate, and efficient than existing prior art containers because the container 102 invokes the virtual machine 104 with the specified microservice code instead of a prior art container invocation.

In some implementations, the container 102 also provides specified microservice code implementations of the Container Runtime Interface (CRI), Open Container Initiative (OCI), and Cloud Native Computing Foundation (CNCF) standards to enable compatibility with the existing container commands and the orchestration frameworks including Kubernetes.

The virtual machine 104 is designed and optimized to run a single instance of a microservice in the form of a single standalone program or artifact. Unlike traditional virtual machines, the virtual machine 104 does not emulate the full complement of hardware in a complete real-world computer. The virtual machine 104 is not designed to run a traditional operating system, so it does not have many facilities that are used by traditional operating systems. For example, when the artifact or executable code corresponding to a microservice application is being executed and sends out a request for additional hardware at a certain point of the execution, a size of memory may be determined and added to the virtual machine 104, or an additional virtual CPU may be activated to adapt to the needs of execution of the executable code in the virtual machine 104. It should be understood that throughout this application, the terms "execution," "run," and "operation" and their derivatives are used interchangeable to mean execution of executable code.

In some implementations, the virtual hardware that the virtual machine 104 presents to the guest software executing on it, is limited to the one or more CPUs and linear-addressed memory to support the microservice application 158. Therefore, the virtual machine 104 does not need to implement a virtual computer hardware component known as a memory management unit (MMU) to handle memory and caching operations associated with the CPU.

In some implementations, instead of booting an operating system from external hardware as implemented in traditional virtual machines, the virtual machine 104 initializes memory with the guest microservice code and data, and starts execution with the first instruction of the microservice code.

The virtual machine 104 allows both memory and CPUs to be added and deleted during the execution of microservice application code on an as needed basis. Therefore, the virtual machine configuration is dynamically changed on demand or dynamically configured on demand in the virtual machine 104 to accommodate guest program requests. Additional virtual hardware support of the virtual machine 104 is also configurable according to the application needs.

The container library 106 is designed to provide a runtime environment for an instance of a microservice. In some implementations, the container library 106 is a runtime library. In some implementations, the container library 106 implements the subset of Portable Operating System Interface (POSIX) functionality that is commonly used by microservice instances. It should be noted that the microservice instances do not utilize the vast majority of the services and facilities that have been built into UNIX or Linux. Unlike the full Linux standard C library (libc) implementation, the container library 106 assumes that there is only a single consumer of the Application Program Interface (API) functionality. This allows for a simplified implementation, which is optimized for a non-shared use case.

The runtime container library 106 is implemented as a collection of library functions. The API is compliant with the subset of POSIX implemented in the container library 106. The microservice user code 110 is linked with the runtime container library 106 to produce executable code on the virtual machine 104. The executable code or unikernel 108 is a statically linked executable and linkable format (ELF) executable file. The unikernel 108 contains the microservice code as well as the functions from the container library 106 that are called from the microservice. However, the unikernel 108 does not include any functions that are not needed for the operation of the unikernel 108. For instance, if the microservice never performs a write operation into a file, the container library 106 would not have a write function linked to the unikernel 108.

Figure 2:
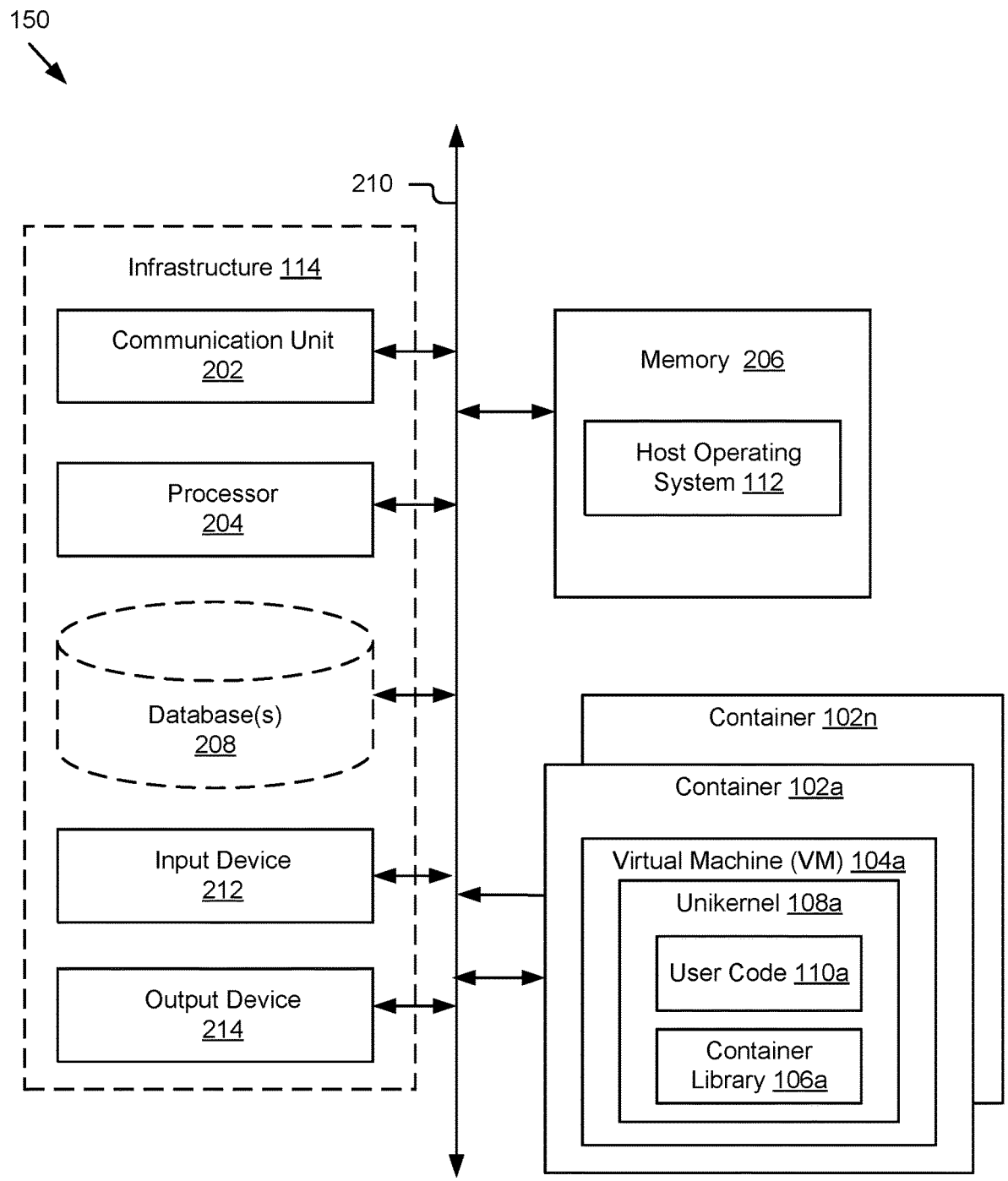
FIG. 2 is a block diagram of an example host server including various components in accordance with the present disclosure.

FIG. 2 is a block diagram of another implementation of an example host server 150 having infrastructure 114 including a communication unit 202, a processor 204, database(s) 208, an input device 212, and an output device 214. The host server 150 also includes a memory 206 on which the host operating system 112 runs, and one or more a containers 102a-102n. The various components of the host server 150 may be communicatively coupled by a communication bus 210. The host server 150 depicted in FIG. 2 is a hardware server and provided by way of example. It should be understood that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. While not shown, the host server 150 may include various operating systems, sensors, additional processors, and other physical configurations. The communication unit 202, processor 204, memory 206, etc., are representative of one or more of these components.

The communication unit 202 may include one or more interface devices for wired and wireless connectivity among the components of the host server system 150. For instance, the communication unit 202 may include, but is not limited to, various types known connectivity and interface options. The communication unit 202 may be coupled to other components of the host server 150 via the bus 210. The communication unit 202 can provide other connections to the network 210 and to other entities of the system 100 using various standard communication protocols.

In some implementations, the communication unit 202 includes a wireless transceiver for exchanging data with other entities, or any other communication channel using one or more wireless communication methods, such as IEEE 802.11, IEEE 802.16, BLUETOOTH® or another suitable wireless communication method.

In some implementations, the communication unit 202 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In some implementations, the communication unit 202 includes a wired port and a wireless transceiver. The communication unit 202 also provides other conventional connections to the network for distribution of files and/or media objects using standard network protocols such as TCP/IP, HTTP, HTTPS and SMTP as will be understood to those skilled in the art.

The processor 204 comprises an arithmetic logic unit, a microprocessor, a general-purpose controller or some other processor array to perform computations and provide electronic display signals to a display device. The processor 204 may be coupled to the bus 210 for communication with the other components. The processor 204 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability might be enough to perform complex tasks, including various types of feature extraction and matching. It should be understood that other processors, operating systems, sensors, displays and physical configurations are possible.

The memory 206 stores instructions and/or data that may be executed by processor 204. The memory 206 is coupled to the bus 210 for communication with the other components. The instructions and/or data may comprise code for performing any and/or all of the techniques described herein. The memory 206 may be a dynamic random access memory (DRAM) device, a static random access memory (SRAM) device, flash memory or some other memory device known in the art. In some implementations, the memory 206 also includes a non-volatile memory or similar permanent storage device and media such as a hard disk drive, a floppy disk drive, a CD ROM device, a DVD ROM device, a DVD RAM device, a DVD RW device, a flash memory device, or some other mass storage device known in the art for storing information on a more permanent basis.

The database(s) 208 may include information sources for storing and providing access to data. In some implementations, database(s) 208 may store data associated with a database management system (DBMS) operable on the host server system 150. For example, the DBMS could include a structured query language (SQL) DBMS, a NoSQL DMBS, various combinations thereof, etc. In some instances, the DBMS may store data in multi-dimensional tables comprised of rows and columns, and manipulate, (e.g., insert, query, update and/or delete rows of data using programmatic operations.

The database(s) 208 may be included in the host server 150 or in another computing system and/or storage system distinct from but coupled to or accessible by the host server 150. The database(s) 208 can include one or more non-transitory computer-readable mediums for storing the data. In some implementations, the database(s) 208 may be incorporated with the memory 206 or may be distinct therefrom.

The input device 212 may include any device for inputting information into the host server 150. In some implementations, the input device 212 may include one or more peripheral devices. For example, the input device 212 may include a keyboard, a pointing device, microphone, an image/video capture device (e.g., camera), a touch-screen display integrated with the output device 214, etc. The output device 214 may be any device capable of outputting information from the host server 150. The output device 214 may include one or more of a display (LCD, OLED, etc.), a printer, a haptic device, an audio reproduction device, a touch-screen display, a remote computing device, etc. In some implementations, the output device is a display that may display electronic images and data output by a processor of the host server 150 for presentation to a user, such as the processor 204 or another dedicated processor.

The container 102 includes the virtual machine 104 and the container library 106, which will be respectively described below with reference to FIGS. 3A-3C.

The bus 210 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The components 102, 202, 204, 206, 208, 212, and/or 214 may be communicatively coupled by bus 210 and/or processor 204 to one another and/or the other components of the host server 150. In some implementations, the components 102, 202, 204, 206, 208, 212, and/or 214 may include computer logic (e.g., software logic, hardware logic, etc.) executable by the processor 204 to provide their acts and/or functionality. In any of the foregoing implementations, these components 102, 202, 204, 206, 208, 212, and/or 214 may be adapted for cooperation and communication with processor 204 and the other components of the host server 150.

Figure 3A:
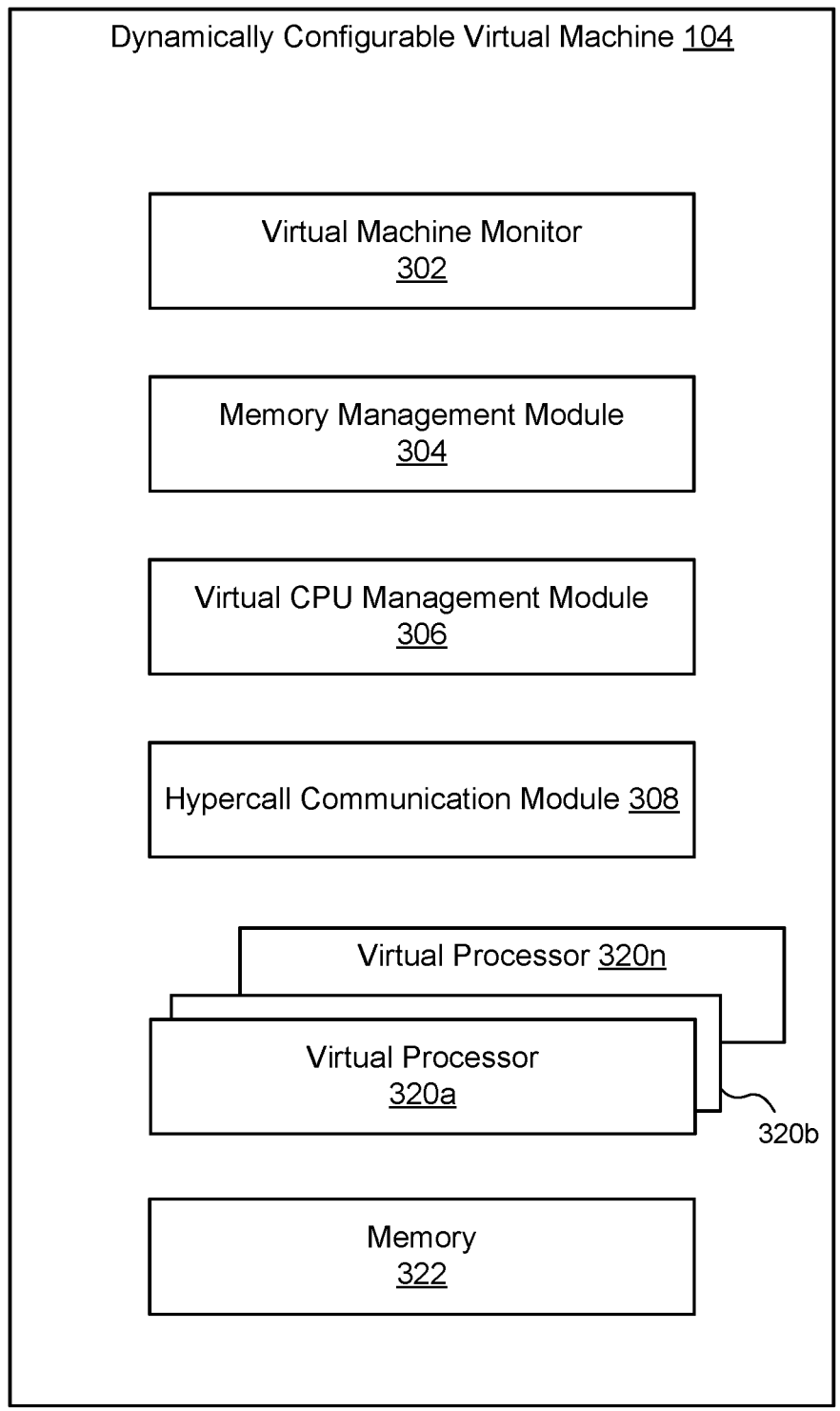
FIG. 3A is a block diagram of an example implementation of the virtual machine of FIG. 2 in accordance with the present disclosure.

FIG. 3A is a block diagram of example implementation of the virtual machine 104. As depicted in FIG. 3A, the virtual machine 104 includes a virtual machine monitor 302, a memory management module 304, a virtual CPU management module 306, and a hypercall communication module 308.

In some implementations, the virtual machine 104 may be built using Linux's Kernel-based Virtual Machine (KVM) kernel module. A KVM requires a user space program called a virtual machine monitor to initialize the virtual machine facilities and run the emulation of hardware. For KVM, a quick emulator (QEMU) is a widely used virtual machine manager. The QEMU may emulate a vast variety of hardware peripherals, CPU types, and peripheral buses. However, since the virtual machine 104 of the present implementation is designed to run only unikernel payloads that don't require additional hardware, there is no other hardware that needs to be emulated. Thus, the virtual machine 104 is simplified and, so many of the features of the QEMU are not needed for the virtual machine 104 of the present disclosure. Therefore, rather than using the QEMU, the virtual machine monitor 302 is used, which is a much smaller (about 100 times smaller) and simpler program than the QEMU.

The virtual machine monitor 302 of the present disclosure is responsible for initializing the virtual machine 104 and dynamically configuring the virtual machine 104. Prior art virtual machine monitors only initialize their virtual machine once when it starts, and thereafter are used to emulate hardware and not reconfigured. Here the virtual machine monitor 302 initializes the virtual machine 104 and configures the virtual machine 104 on demand. Additionally, the virtual machine monitor 302 can re-configure the virtual machine 104 on demand. Since only a limited set (a CPU, memory) of hardware is initially allocated, the virtual machine 104 of the present disclosure has a very quick startup time. The virtual machine monitor 302 controls resource (e.g., virtual CPU, memory) allocation of the virtual machine 104 based on the instructions in the unikernel 108. Since the virtual machine 104 is reconfigurable on demand responsive to the unikernel 108, it has runtime efficiency not matched by the prior art.

As just noted above, one particular advantage of the virtual machine 104 of the present disclosure is its quick start up time. The virtual machine 104 has a quick start up time because it is simplified (doesn't emulate any unnecessary hardware other than a single CPU and memory). This is a particular advantage because the virtual machine 104 of the present disclosure is well suited for the needs of microservices that provide the "back end" to front-end systems like mobile apps, computers, autonomous vehicles, etc. because such microservices don't communicated with things like keyboards, video displays, and the myriad other hardware devices (PCI buses, Ethernet chips, SCSI HBAs, video processors, etc.) that might be part of a physical computer. The simplified design of the virtual machine 104 is also advantageous because it suits the portability of many microservices which abstract out dependencies on specific hardware (and even OS software) as much as possible. Since the only way many microservices communicate with to other microservices or entities is via network API, most microservices have no need to interface with any hardware besides the CPU it runs on and the memory needed to operate it. The simplified design of the virtual machine 104 eliminates having to virtualize a vast array of other hardware that is wasted on most well-constructed microservices. Thus, the simplification of the scope of virtual hardware provided allows the virtual machine 104 to be much simpler and smaller. Simplicity makes the virtual machine 104 more robust, and smaller which expose less attack surface malware. This in turn means less physical hardware resources needed to run the microservice, which at scale means lower cost to run larger numbers of microservices. Making the virtual machine 104 in which the microservice runs as small and simplified as possible provides more robustness, security, efficiency, and cost are improved.

A second particular advantage of the virtual machine 104 of the present disclosure is its reconfigurability on demand which increases its runtime efficiency. To support how microservices operate, the virtual machine 104 advantageously allows dynamic configurability of the two types of hardware it does use, namely CPU and memory. Typical prior art virtual machines and containers do not support this, which is one of their disadvantages. Because the number of virtual CPUs has to be specified a priori, if a user fails to configure enough virtual CPUs, the application performance will be negatively impacted. This problem of not allocating enough virtual hardware a priori can bring so large a penalty that users generally over-configure or allocate virtual CPUs. This is, however, also a problem because that means virtual CPUs are often over-provisioned, which translates to needing more physical CPU cores to run an estate of applications, which unnecessarily raises operating costs, wastes power, and increases the carbon footprint of the application. Therefore, the virtual machine 104 of the present disclosure provides better solution that starts with minimal hardware resources (virtual CPUs and memory) allocated for the microservice, and then dynamically adds (or removes) resources as the microservice operates so that virtual hardware demand is more correctly matched by supply.

The virtual machine monitor 302 configures the virtual machine 104 based on the code embodied in the virtual machine 104. In some implementations, the virtual machine 104 starts with minimal memory and a single virtual CPU to receive and execute the unikernel 108 code. As the code executes and requests additional resources, the virtual machine monitor 302 communicates with other components of the virtual machine 104 to allocate the requested additional resources to continue the execution of the code. For example, if the payload requests a new thread, the virtual machine monitor 302 coupled with the virtual CPU management module 306 (as described below) may create a new virtual CPU. If the payload requests or needs additional memory, the virtual machine monitor 302 works with the memory management module 304 (as described below) to add more memory. The virtual machine monitor 302 may also monitor the execution of the code to identify a resource(s) that is no longer requested and work with other components of the virtual machine 104 to timely deallocate/remove the identified resource(s).

Therefore, the virtual machine monitor 302 achieves dynamic virtual machine configuration through resource allocation control, which optimizes the resource usage in the virtual machine 104 since the computing environment of the virtual machine is adjusted, adapted, and established to execute the microservice application code and to satisfy the user need. In other words, the resources of the virtual machine 104 are scaled up and down as needed to efficiently execute the microservice code.

Figure 4:
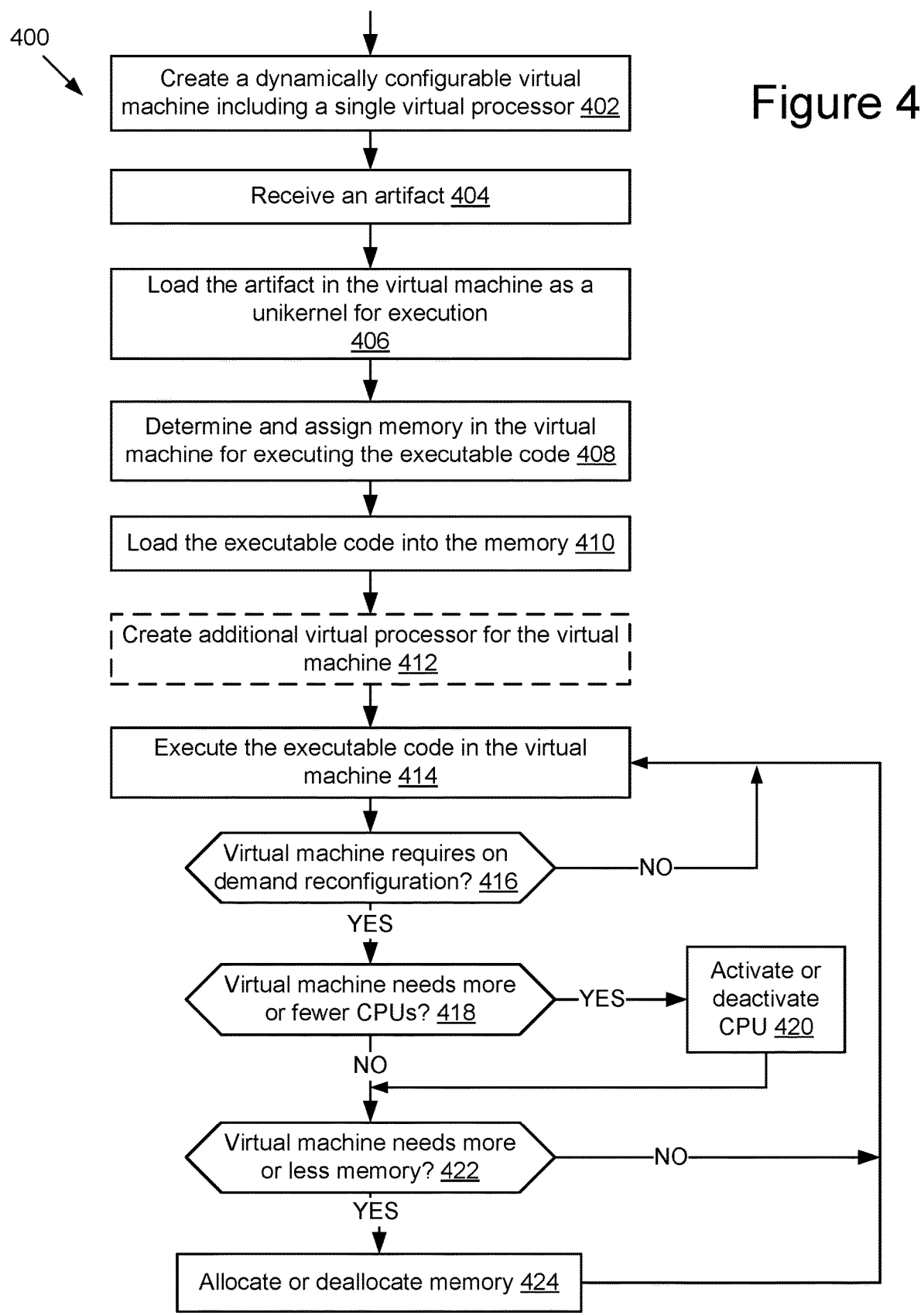
FIG. 4 is a flowchart of an example method for creating a virtual machine for executing microservice application code in accordance with the present disclosure.

Referring now also to FIG. 4, a flowchart of a general method 400 for creating the virtual machine 104 for executing microservice application code will be described. At step 402, the virtual machine monitor 302, cooperating with the memory management module 304 and the virtual CPU module 306, creates the dynamically configurable virtual machine 104 with a single processor. For example, the virtual machine monitor 302 instructs the virtual CPU management module 306 to create the virtual machine 104 with the same CPU features, the same CPU ID, as the host CPU of the host server 150. A CPU may be implemented with a subset of possible CPU features if it becomes desirable to have a common denominator for compatibility between hosts.

At step 404, the virtual machine monitor 302 receives and artifact 154. At step 406, the virtual machine monitor 302 loads the artifact 154 in the virtual machine 104 as a unikernel 108 for execution. At step 408, the virtual machine monitor 302 communicates with the memory management module 304 to determine and assign memory in the virtual machine 104 for executing the executable code. At step 410, the virtual machine monitor 302 loads the executable code into the memory. If the virtual machine monitor 302 determines that and additional processor is also needed for executing the code, at step 412, the virtual machine monitor 302 instructs the virtual CPU management module 306 to create one or more additional virtual processor(s). Step 412 is depicted in dashed lines to show that it is optional. Once the resources have been allocated to meet the application's need, at step 414, the virtual machine monitor 302 along with other components of the container 102 begins execution of the executable code in the virtual machine 104.

At step 416, the virtual machine monitor 302 determines whether the virtual machine 104 requires on demand reconfiguration based on monitoring the execution of the executable code. For example, the virtual machine monitor 302 determines whether one or more additional CPUs and/or memory are needed when a specific function is being executed. If the reconfiguration is not required, the execution of the executable code continues at step 414. However, if the reconfiguration is required, the method 400 goes to step 418.

At step 418, the virtual machine monitor 302 determines whether the virtual machine 104 needs more or fewer virtual CPUs. If such a change is needed, at step 420, the virtual machine monitor 302 cooperates with the virtual CPU management module 306 to activate or deactivate a virtual CPU. This process is described in more detail below with reference to FIGS. 7 and 8. If it is determined that the computing power does not need to change at step 418 or the change of the computing power has completed in step 420, the method 400 moves to step 422.

At step 422, the virtual machine monitor 302 determines whether the virtual machine 104 needs more or less memory. If more or less memory is needed, at step 424, the virtual machine monitor 302 cooperates with the memory management module 304 to allocate or deallocate memory. This process is described in more detail below with reference to FIGS. 5 and 6. If it is determined that there is no memory change at step 422 or the memory change has completed at step 424, the method 400 goes back to step 414 and continues to monitor the execution of the executable code in the virtual machine 104.

Referring back to FIG. 3A, it can be seen the virtual machine 104 also includes the memory management module 304. The memory management module 304 initializes and manages memory 322 (see FIG. 3B) accessible by the virtual machine 104. In one implementation, the memory 322 is the same memory 206 used for the host operating system 112. In another implementation, the memory 322 is different from the memory 206 but accessible by the infrastructure 114 and dedicated for use by the virtual machine 104. In yet another implementation, the memory 322 is shared by a plurality of servers (not shown). In some implementations, the memory 322 used in the virtual machine 104 is linear. The memory management module 304 achieves a linear memory by mapping the virtual addresses linearly to the physical memory addresses. In some implementations, the memory management module 304 creates a small reserved region 312 of physical memory in the virtual machine 104, and initializes the Page Map Level 4 (PML4) hierarchy in these pages of the reserved region 312. Each virtual CPU 320a . . . 320n, when initialized, uses the same PML4 hierarchy because the memory management module 304 will initialize the Control Register (CR3) accordingly. The memory management module 304 does not map the reserved region 312, i.e., there are no virtual addresses pointing to the reserved pages.

Initially, the memory management module 304 creates only the reserved pages; and thus, there is no other physical memory in the virtual machine 104. Conversely, the PML4 hierarchy maps no virtual addresses.

Since it would be too expensive to allocate maximum possible memory for all payloads, the memory management module 304 allocates and maps memory on demand, for example, based on requests from the received guest microservice code. In some implementations, the memory management module 304 receives two types of requests—brk( ) and anonymous mmap( ). The brk( ) request defines the top of a program data segment. The memory management module 304 configures a malloc( ) facility to use the brk( ) request to expand or shrink the data segment as necessary. The anonymous mmap( ) request is used to obtain an area of mapped virtual addresses. The memory management module 304 usually places the area close to the top of a virtual memory range.

Before the microservice program can start executing, the memory management module 304 needs memory in which to place the executable code, initialized data, and allocated space for the data segment. In some implementations, the memory management module 304 determines the necessary size of this memory based on analyzing the microservice Executable and Linkable Format (ELF) file. The memory management module 304 then mimics the brk( ) call to allocate the necessary memory, and initializes that memory with the code and initialized data from the ELF file.

In some implementations, in order to amortize the expense of memory allocation, the memory management module 304 manages memory in exponentially increasing memory regions, for example, starting from 2 MB and growing to the half size of the supported physical memory size. The memory management module 304 symmetrically configures the topmost memory region to be 2 MB, and then changes the memory region exponentially counting down to the half-size point. An illustration is shown in Table 1 below.

brk( ) request into the low physical memory regions. The memory management module 304 also configures anonymous mmap( ) calls to use the high virtual addresses. For example, the memory management module 304 maps an anonymous mmap( ) call linearly to the offset of a top virtual address minus the physical memory size.

Figure 5:
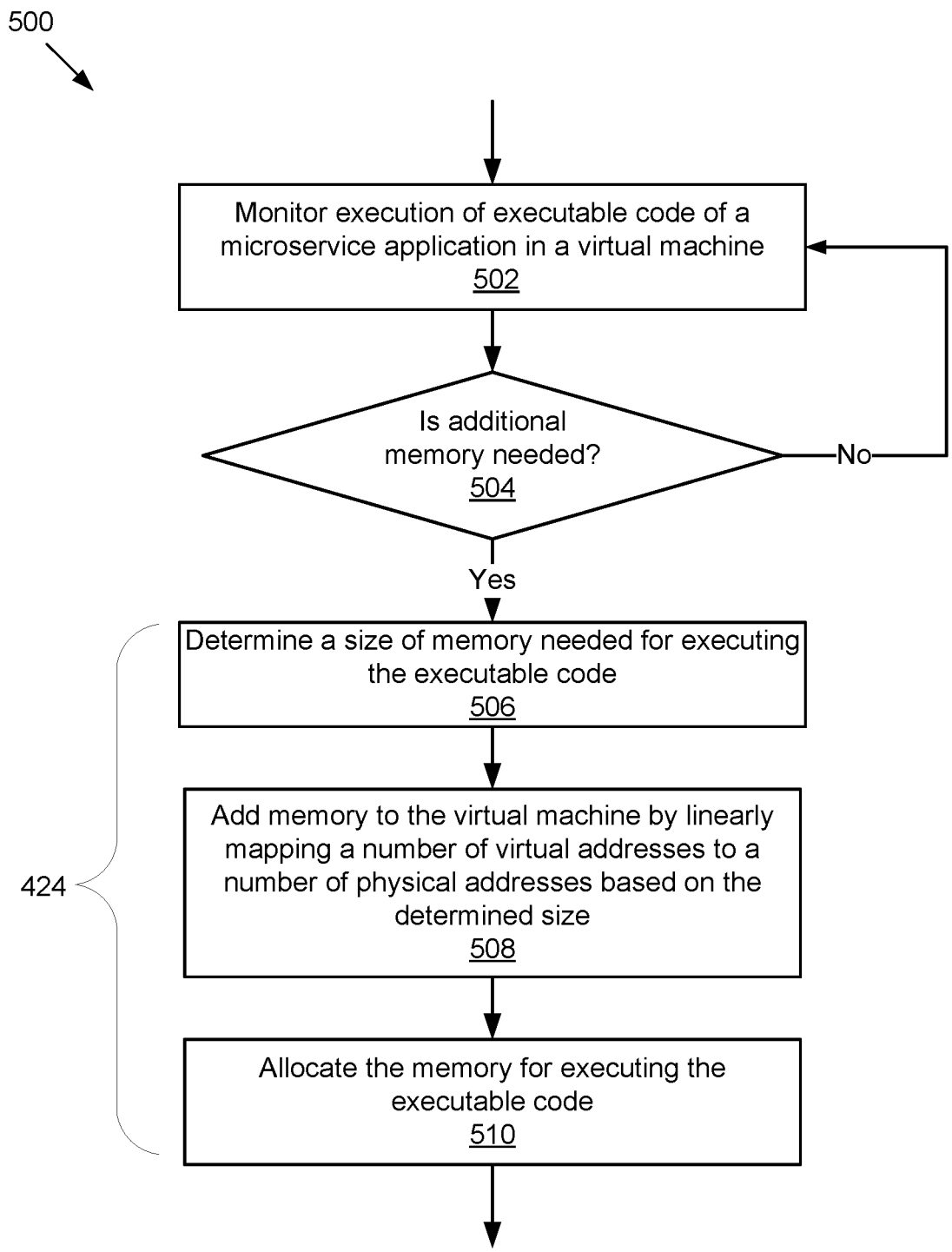
FIG. 5 is a flowchart of an example method for allocating memory to a virtual machine in accordance with the present disclosure.

FIG. 5 is a flowchart of an example method 500 for allocating memory to the virtual machine 104. In the prior art, a virtual machine is instantiated at boot time with a specific fixed size of memory. Therefore, no more memory can be added if the virtual machine is used to implement more functionalities later. However, the virtual machine 104 described herein allows dynamic memory configuration; and thus, benefits in flexibility, efficiency, etc. As depicted in FIG. 5 and FIG. 3C described below, the virtual machine 104 starts with minimal memory and runs with more memory as additional memory is allocated when the unikernel 108 code needs it.

TABLE 1

| start(hex) | START | SIZE | clz | clz-r | idx | memreg-base | memreg-size | memreg-top |
|---|---|---|---|---|---|---|---|---|
| 0x200000 | 2 mb | 2 mb | 42 | 25 | 1 | 2 mb | 2 mb | 4 mb |
| 0x400000 | 4 mb | 4 mb | 41 | 25 | 2 | 4 mb | 4 mb | 8 mb |
| 0x800000 | 8 mb | 8 mb | 40 | 25 | 3 | 8 mb | 8 mb | 16 mb |
| 0x1000000 | 16 mb | 16 mb | 39 | 25 | 4 | 16 mb | 16 mb | 32 mb |
| 0x2000000 | 32 mb | 32 mb | 38 | 25 | 5 | 32 mb | 32 mb | 64 mb |
| 0x4000000 | 64 mb | 64 mb | 37 | 25 | 6 | 64 mb | 64 mb | 128 mb |
| 0x8000000 | 128 mb | 128 mb | 36 | 25 | 7 | 128 mb | 128 mb | 256 mb |
| 0x10000000 | 256 mb | 256 mb | 35 | 25 | 8 | 256 mb | 256 mb | 512 mb |
| 0x20000000 | 512 mb | 512 mb | 34 | 25 | 9 | 512 mb | 512 mb | 1 gb + 0 mb |
| 0x40000000 | 1 gb + 0 mb | 1 gb + 0 mb | 33 | 25 | 10 | 1 gb + 0 mb | 1 gb + 0 mb | 2 gb + 0 mb |
| 0x80000000 | 2 gb + 0 mb | 2 gb + 0 mb | 32 | 25 | 11 | 2 gb + 0 mb | 2 gb + 0 mb | 4 gb + 0 mb |
| 0x100000000 | 4 gb + 0 mb | 4 gb + 0 mb | 31 | 25 | 12 | 4 gb + 0 mb | 4 gb + 0 mb | 8 gb + 0 mb |
| 0x200000000 | 8 gb + 0 mb | 8 gb + 0 mb | 30 | 25 | 13 | 8 gb + 0 mb | 8 gb + 0 mb | 16 gb + 0 mb |
| 0x400000000 | 16 gb + 0 mb | 16 gb + 0 mb | 29 | 25 | 14 | 16 gb + 0 mb | 16 gb + 0 mb | 32 gb + 0 mb |
| 0x800000000 | 32 gb + 0 mb | 32 gb + 0 mb | 28 | 25 | 15 | 32 gb + 0 mb | 32 gb + 0 mb | 64 gb + 0 mb |
| 0x1000000000 | 64 gb + 0 mb | 64 gb + 0 mb | 27 | 25 | 16 | 64 gb + 0 mb | 64 gb + 0 mb | 128 gb + 0 mb |
| 0x2000000000 | 128 gb + 0 mb | 128 gb + 0 mb | 26 | 25 | 17 | 128 gb + 0 mb | 128 gb + 0 mb | 256 gb + 0 mb |
| 0x4000000000 | 256 gb + 0 mb | 128 gb + 0 mb | 25 | 25 | 18 | 256 gb + 0 mb | 128 gb + 0 mb | 384 gb + 0 mb |
| 0x6000000000 | 384 gb + 0 mb | 64 gb + 0 mb | 25 | 26 | 19 | 384 gb + 0 mb | 64 gb + 0 mb | 448 gb + 0 mb |
| 0x7000000000 | 448 gb + 0 mb | 32 gb + 0 mb | 25 | 27 | 20 | 448 gb + 0 mb | 32 gb + 0 mb | 480 gb + 0 mb |
| 0x7800000000 | 480 gb + 0 mb | 16 gb + 0 mb | 25 | 28 | 21 | 480 gb + 0 mb | 16 gb + 0 mb | 496 gb + 0 mb |
| 0x7c00000000 | 496 gb + 0 mb | 8 gb + 0 mb | 25 | 29 | 22 | 496 gb + 0 mb | 8 gb + 0 mb | 504 gb + 0 mb |
| 0x7e00000000 | 504 gb + 0 mb | 4 gb + 0 mb | 25 | 30 | 23 | 504 gb + 0 mb | 4 gb + 0 mb | 508 gb + 0 mb |
| 0x7f00000000 | 508 gb + 0 mb | 2 gb + 0 mb | 25 | 31 | 24 | 508 gb + 0 mb | 2 gb + 0 mb | 510 gb + 0 mb |
| 0x7f80000000 | 510 gb + 0 mb | 1 gb + 0 mb | 25 | 32 | 25 | 510 gb + 0 mb | 1 gb + 0 mb | 511 gb + 0 mb |
| 0x7fc0000000 | 511 gb + 0 mb | 512 mb | 25 | 33 | 26 | 511 gb + 0 mb | 512 mb | 511 gb + 512 mb |
| 0x7fe0000000 | 511 gb + 512 mb | 256 mb | 25 | 34 | 27 | 511 gb + 512 mb | 256 mb | 511 gb + 768 mb |
| 0x7ff0000000 | 511 gb + 768 mb | 128 mb | 25 | 35 | 28 | 511 gb + 768 mb | 128 mb | 511 gb + 896 mb |
| 0x7ff8000000 | 511 gb + 896 mb | 64 mb | 25 | 36 | 29 | 511 gb + 896 mb | 64 mb | 511 gb + 960 mb |
| 0x7ffc000000 | 511 gb + 960 mb | 32 mb | 25 | 37 | 30 | 511 gb + 960 mb | 32 mb | 511 gb + 992 mb |
| 0x7ffe000000 | 511 gb + 992 mb | 16 mb | 25 | 38 | 31 | 511 gb + 992 mb | 16 mb | 511 gb + 1008 mb |
| 0x7fff000000 | 511 gb + 1008 mb | 8 mb | 25 | 39 | 32 | 511 gb + 1008 mb | 8 mb | 511 gb + 1016 mb |
| 0x7fff800000 | 511 gb + 1016 mb | 4 mb | 25 | 40 | 33 | 511 gb + 1016 mb | 4 mb | 511 gb + 1020 mb |
| 0x7fffc00000 | 511 gb + 1020 mb | 2 mb | 25 | 41 | 34 | 511 gb + 1020 mb | 2 mb | 511 gb + 1022 mb |

The memory management module 304 communicates with the virtual machine monitor 302 to allocate and deallocate the memory 322 as the execution of the code progresses. The memory management module 304 also updates the PML4 hierarchy when allocating and deallocating the memory 322. In some implementations, the memory management module 304 uses 2 MB huge pages for the first and last nine regions and uses 1 GB huge pages for the rest regions. In some implementations, the memory management module 304 does not use 4 KB pages in the PML4 hierarchy such that the PML4 hierarchy includes at most three layers.

In some implementations, the memory management module 304 performs a one-to-one mapping to map the virtual addresses starting from 0 to the top point that is defined by At step 502, the virtual machine monitor 302 monitors execution of executable code of a microservice application in the virtual machine 104. At this initial stage, the virtual machine 104 may include only a small area of memory (e.g., See FIG. 3B, initial allocation 324).

At step 504, the virtual machine monitor 302 determines whether additional memory is needed. For example, the virtual machine monitor 302 may receive a request for memory from the payload of the microservice application code. If no additional memory is needed, the method 500 moves back to step 502 to continue monitoring the execution of the executable code.

However, if the virtual machine monitor 302 determines that additional memory is needed, at step 506, the memory management module 304 determines the size of memory needed, necessary or used for executing the executable code. In some implementations, the determination of memory is a determination of an optimal amount of memory to allow the code to efficiently execute. Steps 506-510 correspond to allocating memory of step 424 in FIG. 4. At step 508, the memory management module 304 adds memory to the virtual machine 104 by linearly mapping a number of virtual addresses to a number of physical addresses based on the determined size. At step 510, the memory management module 304 allocates the added memory for executing the executable code. For example, the memory management module 304 mimics a brk( ) call to allocate the necessary memory, and initializes that memory with the code and data.

Figure 6:
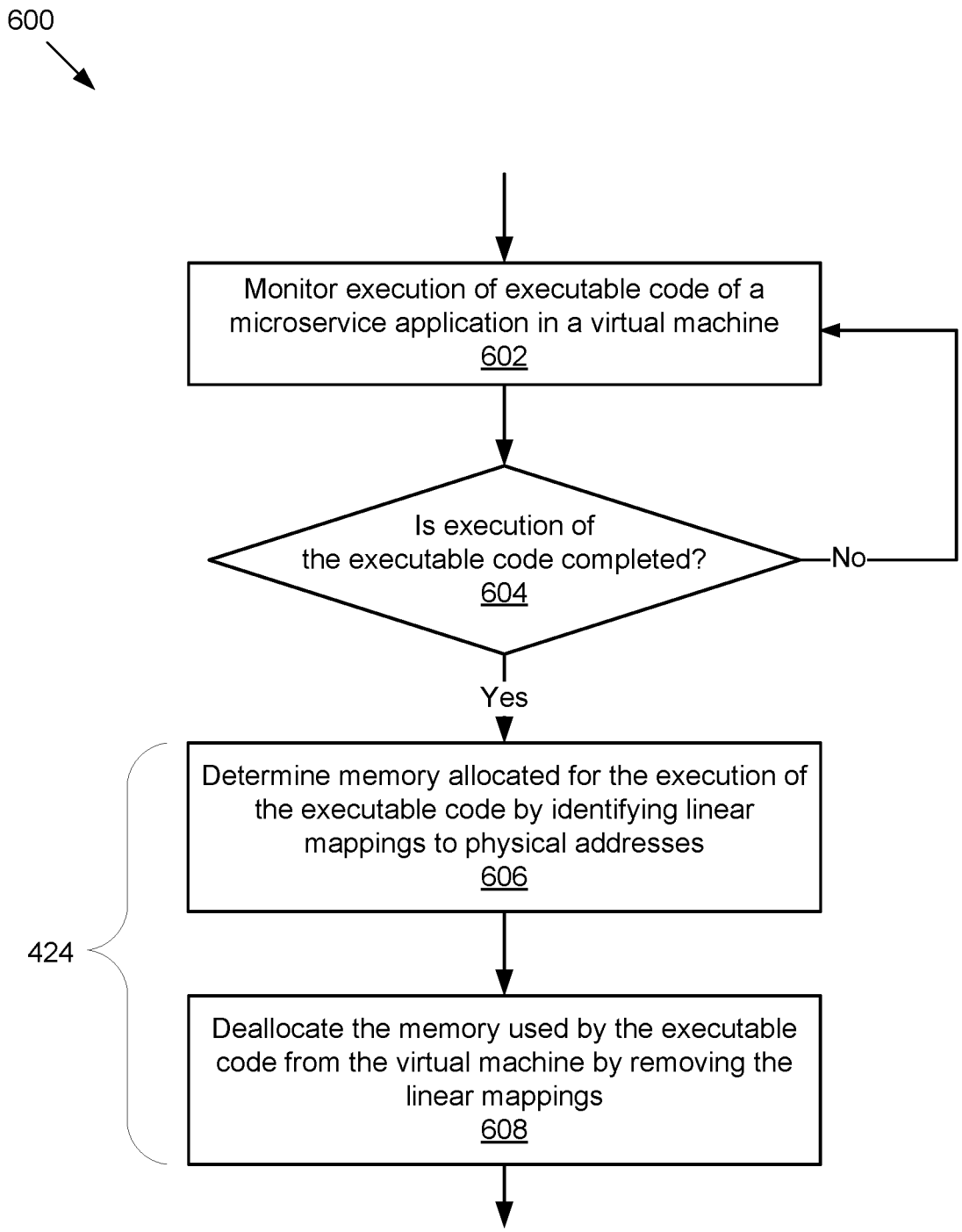
FIG. 6 is a flowchart of an example method for deal locating memory of a virtual machine in accordance with the present disclosure.

FIG. 6 is a flowchart of an example method 600 for deallocating memory of the virtual machine 104. At step 602, the virtual machine monitor 302 monitors the execution of executable code of a microservice application in the virtual machine 104. At step 604, the virtual machine monitor 302 determines whether the execution of the executable code is completed. In some implementations, even if the execution of a portion of executable code (e.g., a function) is completed, the virtual machine monitor 302 may cooperate with the memory management module 304 to relieve the memory used by this portion of executable code. If the execution of the executable code is not completed, the virtual machine monitor 302 continues monitoring the code execution.

If the virtual machine monitor 302 determines 604 that the execution of the executable code has completed, at step 606, the memory management module 304 determines memory allocated for the execution of the executable code by identifying linear mappings to physical addresses. At step 608, the memory management module 304 deallocates the memory used by the executable code from the virtual machine 104 by removing the linear mappings. Steps 606 and 608 correspond to deallocating memory of step 424 in FIG. 4.

Referring now back to FIG. 3A, the virtual machine 104 also includes the virtual CPU management module 306. The virtual CPU management module 306 creates, initializes, and manages one or more virtual CPUs in the virtual machine 104. As described herein, the container 102 is started by creating an "empty" virtual machine 104 with a single virtual CPU and minimal memory. The virtual machine 104 receives the unikernel 108 and loads the code to the memory. When loading the code, the memory management module 304 creates memory for executing the code, i.e., dynamic memory allocation. The virtual machine 104 starts executing the code. If the code is simple and does not need additional resources, the code runs normally. If the code creates an additional thread, it sends a request/call for the resources. In the prior art, a system kernel receives this request and puts the request along with other thread requests in a queue to compete for a CPU from available CPUs of a fixed number of CPUs. Rather than the system kernel processing a resource request/call, the virtual CPU management module 306 intercepts the thread request and creates a thread and a virtual CPU, i.e., dynamic CPU allocation. The dynamic CPU and memory allocation guarantee the necessary but optimized computer resources for executing the code on the virtual machine 104, and therefore is advantageous in increasing efficiency and reducing computing cost.

In some implementations, the virtual CPU management module 306 creates a single CPU and a single thread for the microservice application code or guest code. Responsive to the memory management module 304 initializing memory based on the code, the virtual CPU management module 306 creates and initializes the first or main virtual CPU.

In many use cases, x86 hardware CPU, when initialized, is initially in backwards compatibility mode. Once in this mode, the hardware is ready to execute the basic input/output system (BIOS), run the initial loader, initialize the kernel, and finally run the kernel properly. During these steps, the CPU is switched into 64-bit demand paging mode.

The virtual CPU management module 306, on the other hand, performs in a different manner. The virtual CPU management module 306 creates and initializes a first or main virtual CPU 320a (as depicted in FIG. 3B below) in full 64-bit mode that the guest microservice code uses. This virtual CPU 320a has the same features (e.g., CPU ID) as the host machine CPU of the host server 150. The virtual CPU management module 306 may mask some of the features of the host machine CPU 204 to provide a common denominator of CPU features in a cluster.

Figure 3B:
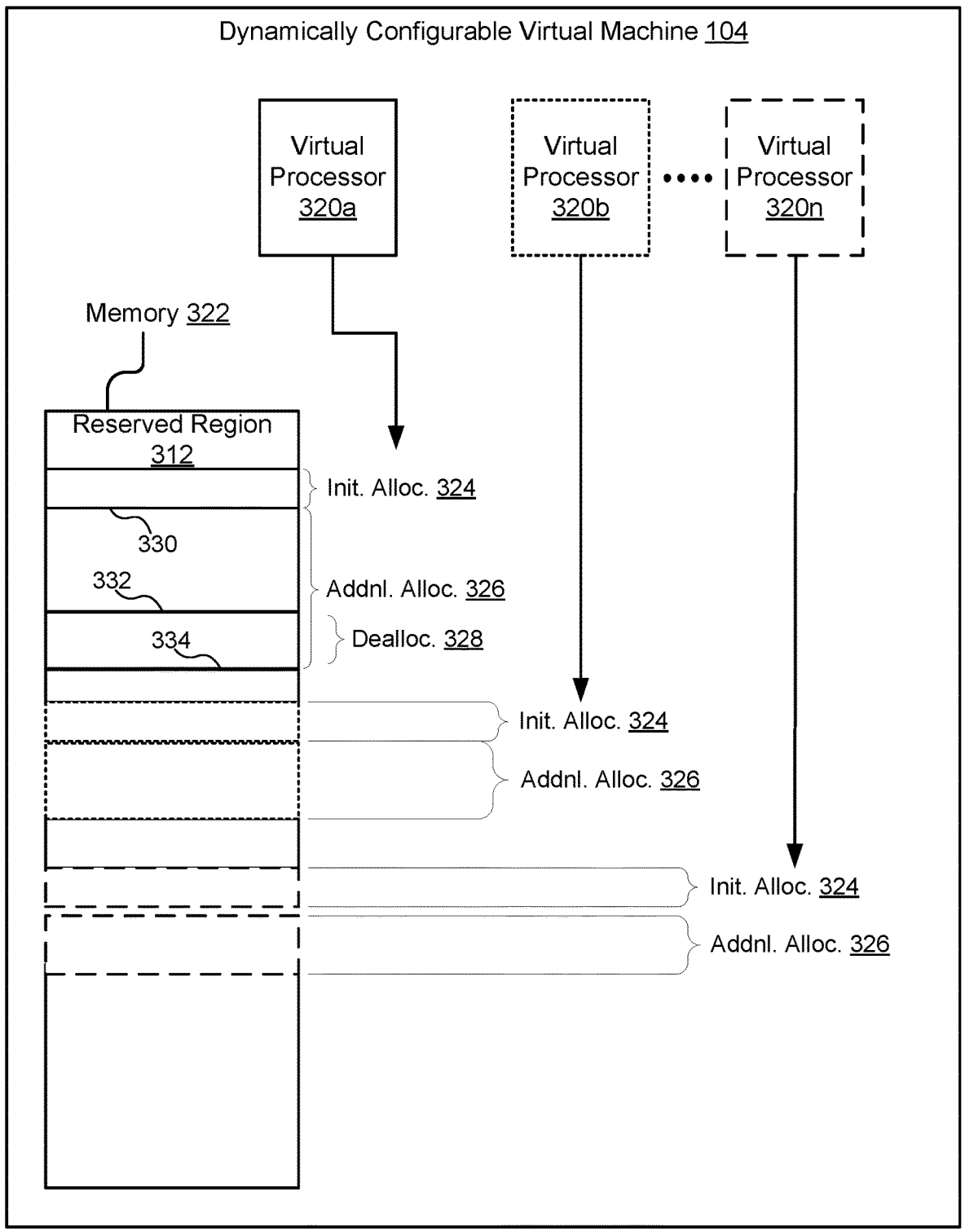
FIG. 3B is a block diagram of an example implementation of creation of virtual CPU(s) and allocation of memory in accordance with the present disclosure.

The virtual CPU management module 306 configures the CR3, the top of the PML4 hierarchy, for the virtual CPU 320a to make sure that each other virtual CPU 320b . . . n (as depicted in FIG. 3B below), when initialized, would use the same PML4 hierarchy. The virtual CPU management module 306 along with the memory management module 304 also mimics a call to mmap( ) to allocate memory for the main stack, and uses the address to initialize the stack pointer (RSP) of the virtual CPU 320a. The virtual CPU management module 306 further communicates with the memory management module 304 to obtain an entry point of the guest code from its ELF header and to set, the Relative Instruction Pointer (RIP) to point at the entry point of the guest code.

The virtual machine 104 is now configured and ready for executing the guest microservice application code or guest code. In some implementations, the virtual CPU management module 306 creates a new pthread and delegates the execution to the pthread. A pthread refers to a POSIX thread, a standards-based thread API that allows a program to control multiple different flows of work that overlap in time. The guest microservice starts executing on the virtual machine 104.

The virtual CPU management module 306 creates only a single virtual CPU 320a in the virtual machine 104 if the guest microservice is a single-threaded program. The virtual machine 104 will run the guest code until the guest code performs exit( ) or return from the main thread. The virtual machine 104 exits responsive to the virtual machine monitor 302 receiving the exit information from the guest code.

In other implementations, the virtual CPU management module 306 creates multiple threads for the guest microservice application code (i.e., multi-threaded guest code) and creates a virtual CPU for each thread. The virtual CPU management module 306 creates additional virtual CPUs on demand from the guest code. For example, the virtual CPU management module 306 creates a new virtual CPU for each new pthread_create( ) call.

The virtual CPU management module 306 creates the new virtual CPU similarly to the creation of the main virtual CPU. The virtual CPU management module 306 imposes the same CPU ID for the new CPU so that virtual CPUs have the same features. The virtual CPU management module 306 then sets up the same PML4 hierarchy in CR3 for all virtual CPUs. The guest program has an option to provide memory for the thread stack. If the memory is not provided, the virtual CPU management module 306 communicating with the memory management module 304 mimics an mmap( ) call to allocate memory for the newly created thread stack, and uses that to initialize the thread's Register Stack Pointer (RSP). If the stack is provided by the guest program, the virtual CPU management module 306 uses the provided stack instead.

Unlike the creation of the main virtual CPU, when creating the other new virtual CPU, the guest program provides an entry point as an argument to pthread_create( ), and the virtual CPU management module 306 uses the value provided by the guest program to set the instruction pointer (RIP).

Once the new virtual CPU is configured to execute the newly created pthread code, the virtual CPU management module 306 creates a new pthread and delegates execution of the guest thread code to the new pthread.

The virtual CPU management module 306 also handles virtual CPU on exits from pthread including reusing the virtual CPU when a new pthread_create( ) request is issued. In some implementations, the guest pthreads finish their execution by either calling pthread_exit( ) or returning from the entry point function. The virtual CPU management module 306 coupled with the virtual machine monitor 302 gathers the exit code, determines if the thread was joinable, and deactivates the virtual CPU accordingly.

In some implementations, the virtual CPU management module 306 should terminate the virtual CPU and exit the associated pthread. However, the virtual CPU management module 306 cannot terminate the virtual CPU because of a KVM limitation. The virtual CPU management module 306 instead marks the virtual CPU as inactive and places the associated thread in a sleep status. The sleeping status indicates that the virtual CPU is not active and waiting for an event to return to an active status.

When the virtual machine monitor 302 receives a new pthread_create( ) request from the guest program executing on the virtual machine, the virtual CPU management module 306 determines whether there is a previously initialized but inactive virtual CPU and reuses this CPU if it exists. The virtual CPU management module 306 reuses this virtual CPU by following the same steps as the initial creation after virtual CPU is created. Instead of creating a new pthread, the virtual CPU management module 306 wakes up the waiting one.

The guest program continues executing on the virtual machine until the virtual machine monitor 302 either receives an exit( ) call from the guest program, or receives a pthread_exit( ) call from the last executing guest thread. The last executing guest thread is the last thread executing chronologically, not necessarily the main thread. Once an exit call is received, the modules 304 and 306 deallocate the CPU or memory for later use.

In addition to the regular virtual CPUs and memory, the virtual CPU management module 306 and the memory management module 304 may also work with other components of the product container 102 to equip the virtual machine 104 with specialized hardware. For example, when the payload initializes a Secure Socket Layer (SSL) library, the library may request a virtual cryptoprocessor to be added to the virtual machine 104 by the virtual CPU management module 306 to facilitate encryption and decryption. The specialized processor is accessible via a set of hypercalls (described below) specific to the virtual hardware type. The virtual CPU management module 306 may also add a graphical processor to the virtual machine 104 to improve machine learning or other specialized high-performance computations. Other specialized virtual hardware that may be added in the virtual machine includes Field-Programmable Gate Array (FPGA), Digital Signal Processor (DSP), TCP Offload Engine (TOE), etc.

Figure 7:
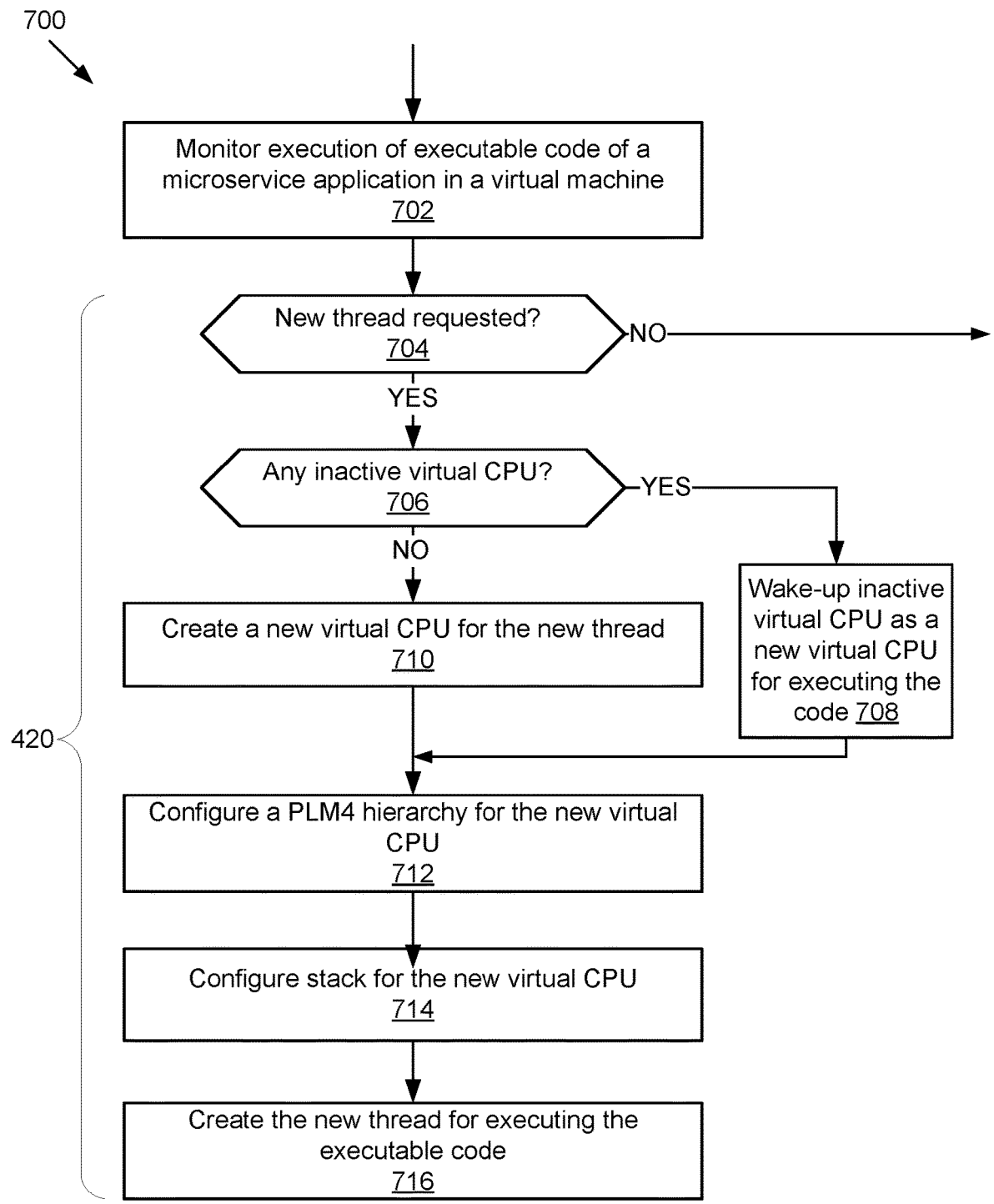
FIG. 7 is a flowchart of an example method for adding a virtual CPU to a virtual machine in accordance with the present disclosure.

FIG. 7 is a flowchart of an example method 700 for adding a virtual CPU to the virtual machine 104. At step 702, the virtual machine monitor 302 monitors execution of executable code of a microservice application in the virtual machine 104. Other steps of FIG. 7 correspond to activating a virtual CPU of step 420 in FIG. 4. At step 704, the virtual CPU management module 306 determines whether a new thread is requested by the executable code. If no new thread is requested, the method 700 moves back to step 702 to continue monitoring the execution of the executable code. However, if a new thread is requested, at step 706, the virtual CPU management module 306 determines whether there is any inactive virtual CPU. If an inactive virtual CPU exists, at step 708, the virtual CPU management module 306 wakes-up the inactive virtual CPU as a new virtual CPU for executing the code. Otherwise, if an inactive virtual CPU does not exist, the virtual CPU management module 306 creates a new virtual CPU for the new thread at step 710. It should be noted that the creation of this new virtual CPU is different than the description above for the creation of the first virtual CPU and does not require the special attributes described above.

After either step 708 or step 710, the virtual CPU management module 306 configures 712 a PML4 hierarchy for the new virtual CPU. The new virtual CPU is the virtual CPU that was newly created or the inactive CPU that was woken up. At step 714, the virtual CPU management module 306 configures the stack for the new virtual CPU or the inactive CPU that was woken up. At step 716, the virtual CPU management module 306 creates a new thread for executing the executable code. For example, once the new virtual CPU or the inactive CPU that was woken up is configured to execute the microservice application thread code, the virtual CPU management module 306 creates a new pthread and delegates execution of the thread code to the new pthread. Responsive to creating the new thread, the execution of the executable code continues and the method 700 moves back to step 702 to monitor the execution of the executable code.

Figure 8:
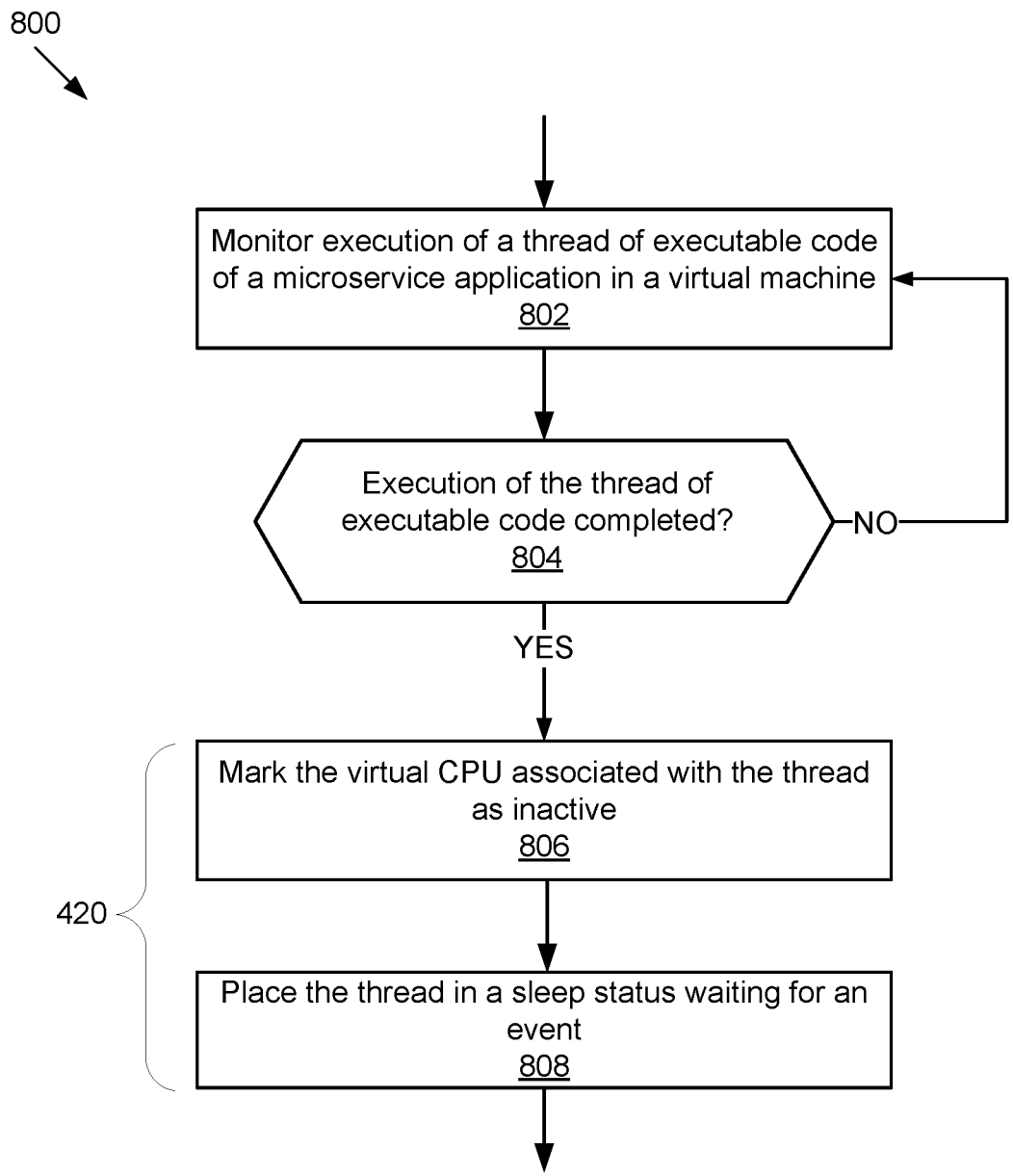
FIG. 8 is a flowchart of an example method for deactivating a virtual CPU of a virtual machine in accordance with the present disclosure.

FIG. 8 is a flowchart of an example method 800 for deactivating a virtual CPU of the virtual machine 104. At step 802, the virtual machine monitor 302 monitors the execution of a thread of executable code of a microservice application in the virtual machine 104. At step 804, the virtual CPU management module 306 determines whether execution of the thread of the executable code has been completed. If the execution is not completed, the method 800 moves back to step 802 to continue monitoring execution of the thread of executable code. Otherwise, if the execution has completed, at step 806, the virtual CPU management module 306 marks the virtual CPU associated with the thread as inactive. At step 808, the virtual CPU management module 306 places the thread in a sleep status. The sleeping status indicates that the virtual CPU is not active and waiting for an event to return to an active state. Steps 806 and 808 correspond to deactivating CPU of step 420 in FIG. 4.

The dynamic configuration on demand of the virtual machine 104 including creation or activation of additional virtual CPU(s), de-activation of virtual CPU(s), allocation of additional memory, or deallocation of memory in the virtual machine 104 is also depicted in FIG. 3B. The virtual machine monitor 302 cooperating with the virtual CPU management module 306 creates a first and main processor, i.e., the virtual CPU 320a, in the virtual machine 104. The virtual machine monitor 302 receives a microservice application program and links it with the container library 106 to generate executable code. Once the executable code is generated, the virtual machine monitor 302 cooperating with the memory management module 304 initializes the virtual machine 104 with an initial allocation 324 of memory 322 and loads the executable code into the memory 322 thereby executing the executable code in the virtual machine 104. For the first virtual CPU 320*a* created, the memory management module 304 also initializes a small reserved region 312 of the memory 322 in the virtual machine 104 and initializes the PML4 hierarchy in reserved region 312 as has been described above. This reserved region 312 is used by the first virtual CPU 320*a*, and other virtual CPUs 320*b*, 320*n* once they have been activated. The initially allocated memory 324 includes an amount of memory space needed for executing the executable code at this initial stage (i.e., the range to address 330).

The executable code starts executing in the virtual machine 104. At one point, the virtual machine monitor 302 determines from the execution of the executable code that additional memory is needed, for example, a specific request, function or operation is called. The virtual machine monitor 302 communicates with the memory management module 304 to reconfigure the memory 322 by assigning an additional allocation 326 of memory 322 to the first virtual CPU 320*a* (i.e., adding the range of memory between addresses 330 and 334).

The execution of the executable code continues until a certain point, for example, when the execution of the specific function is completed. At this point, some of the allocated space of memory 322 ranging from 330 to 334 is no longer needed, and a request for memory change is sent to the virtual machine monitor 302. The virtual machine monitor 302 receives the request and communicates with the memory management module 304 to reconfigure the memory again by performing deallocation 328 of the memory 322 such that a portion of the additional allocated memory ranging from 332 to 334 is deallocated so that the address from 330 to 332 are left for the execution of the rest of the executable code in addition to the initial allocation. It should be understood that the description above is merely an example and in other embodiments any portion or the entire amount of memory 322 from the additional allocation 326 may be deallocated depending on the needs of the execution of the executable code.

Similarly to the memory reconfiguration performed by the memory management module 304, when the executable code sends requests to reconfigure the computing power at certain points, the virtual machine monitor 302 may also communicate with the virtual CPU management module 306 to activate or deactivate one or more other virtual CPUs 320*b* . . . 320*n* for execution of the executable code. As also shown in FIG. 3B, each additional virtual CPUs 320*b* . . . 320*n* has corresponding initially allocated memory 324 and may have an additional allocation 326 as needed. Although not shown, the additional virtual CPUs 320*b* . . . 32*n* has may also deallocate the additional allocation 326 as needed according to the execution of their code.

Through the dynamic reconfiguration on demand, the dynamically configurable virtual machine 104 accommodates guest program requests with the optimized computing resources, thereby increasing efficiency and flexibility.

Referring back to FIG. 3A, the virtual machine 104 is shown including the hypercall communication module 308. The hypercall communication module 308 is the component of the virtual machine 104 that handles hypercalls. A hypercall is a mechanism that guest microservice programs use to communicate with the outside of the virtual machine 104. When a guest program invokes a hypercall, the execution exits virtualization and control is passed back to the hypercall communication module 308. The hypercall communication module 308 determines how to process a hypercall based on the type of the hypercall.

In some implementations, the hypercall communication module 308 simply passes through a hypercall to the host operating system (e.g., Linux) after adjusting and verifying the parameters of the hypercall. For example, the hypercall communication module 308 may send the interaction with hardware such as disk input/output or network socket calls to the host server 150 for processing. In other implementations, the hypercall communication module 308 directly processes a hypercall, for example, requests such as pthread_create( ), mmap( ), or brk( ).

In some implementations, the hypercall communication module 308 implements hypercalls by using an x86 OUT instruction, with which a port number indicates a hypercall type, and the data transferred on the port indicates the location in guest memory where the call parameters are located.

When a guest program executes the OUT instruction, i.e., invoking a hypercall, control is immediately passed to the virtual machine monitor 302. The virtual machine monitor 302 first determines if the requested port number falls within ports registered in the kernel, and passes the IO request to the hypercall communication module 308 if the port number falls outside the ports registered in the kernel. The hypercall communication module 308 uses the port number to decode hypercall parameters and performs the call. Once the hypercall is performed, the hypercall communication module 308 communicates with the virtual machine monitor 302 to resume the execution of the virtualized guest program.

It should be noted that the hypercall communication module 308 may implement a pseudo-device driver that would register the ports corresponding to the pass-through hypercalls as described above, but allows the calls to be performed directly from the kernel. In this way, an exit from the kernel into the hypercall communication module 308 and a returning back from the hypercall communication module 308 to the kernel would be saved, and corresponding computing cost is also saved.

The hypercall communication module 308 and/or the pseudo driver may also examine and verify the parameters and the set of hypercalls that are allowed, to further tighten access to the outside of the guest program, specific to each guest program. This is similar to secure computing mode (seccomp) approach, but controls the in-VM payload access to virtual machine monitor 302 instead of regular process access to operating system.

A guest program does not directly call a hypercall. In some implementations, the guest program uses a standard POSIX API for a hypercall. This allows the guest program to be compatible with both the standard Linux runtime environment and the container 102.

In some implementations, a specific guest program may not use all of the existing and supported hypercalls. The hypercall communication module 308 is customized to include only hypercalls necessary for the specific guest program. This improves isolation and efficiency.

In some implementations, the hypercall communication module 308 also handles functionality offloading payload specific hypercalls. A highly specialized hypercall may be used to implement guest program specific functionality. This is advantageous because the functionality is executed outside of the guest code, and the code is trusted as it is code specific for the virtual container. This approach is possible because the hypercall communication module 308 has full access to the guest memory and CPU status. One example of such a hypercall is the implementation of pthread_create( ). The hypercall communication module 308 implements pthread_create( ) by creating and setting up a new virtual CPU. Other examples of payload specific hypercalls may include an implementation of garbage collection, or just-in-time compilation of executable code, etc.

Figure 9:
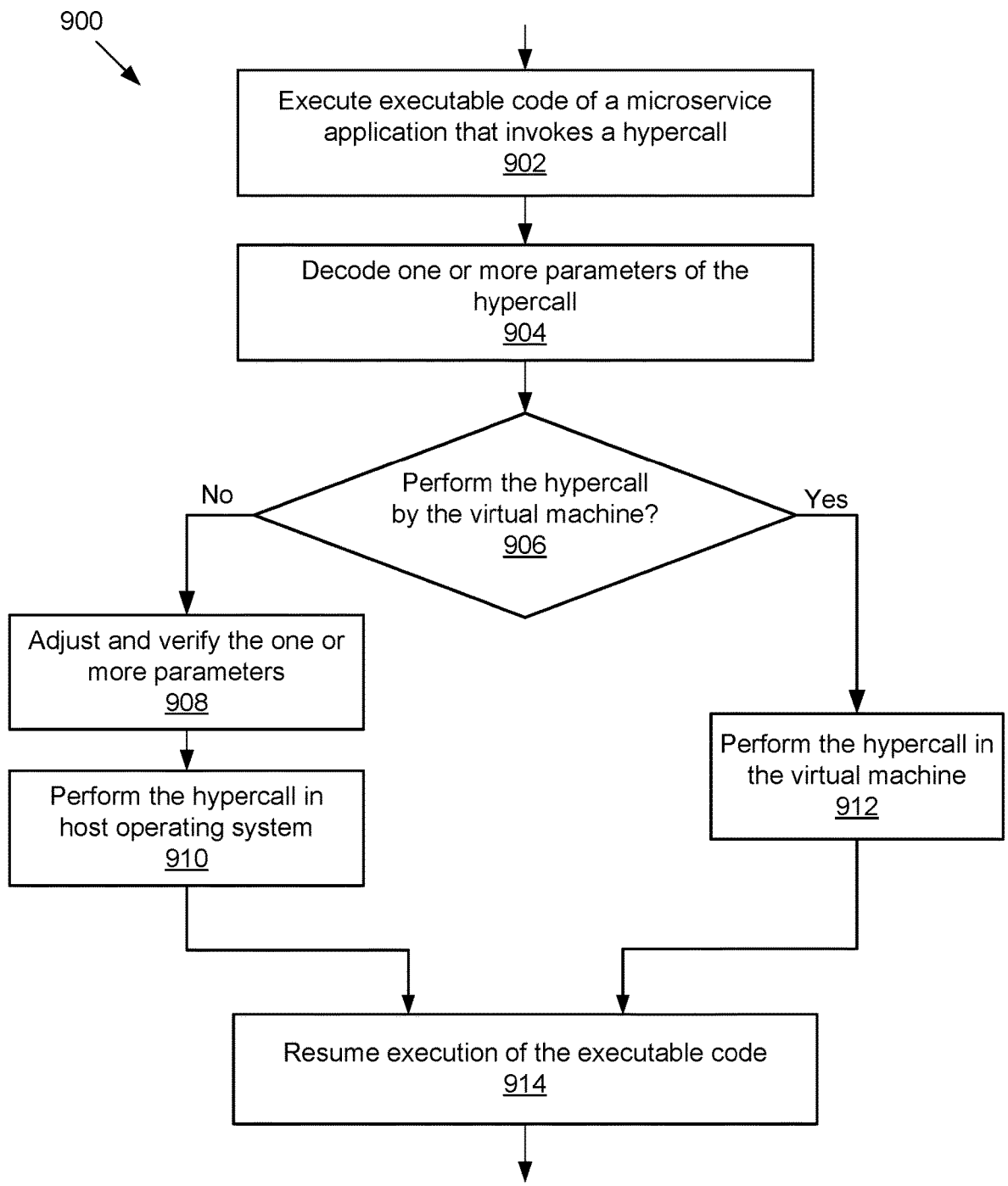
FIG. 9 is a flowchart of an example method for processing a hypercall using a virtual machine in accordance with the present disclosure.

FIG. 9 is a flowchart of an example method 900 for processing a hypercall using the virtual machine 104. At step 902, the virtual machine monitor 302 executes executable code of a microservice application that invokes a hypercall. At step 904, the virtual machine monitor 302 decodes one or more parameters of the hypercall. At step 906, the virtual machine monitor 302 determines whether to perform the hypercall by the virtual machine 104, for example, based on whether the requested port number falls within ports registered in the kernel.

If it is determined that the virtual machine 104 will not perform the hypercall, the virtual machine monitor 302 adjusts and verifies the one or more parameters at step 908, and sends the hypercall together with the adjusted parameters to the host operating system 112 for execution at step 910. Otherwise, if the virtual machine 104 will perform the hypercall, at step 912, the virtual machine monitor 302 communicates with the hypercall communication module 308 to perform the hypercall in the virtual machine 104.

Once the hypercall is performed in either step 910 or 912, the hypercall communication module 308 communicates with the virtual machine monitor 302 to resume 914 the execution of the executable code.

Figure 3C:
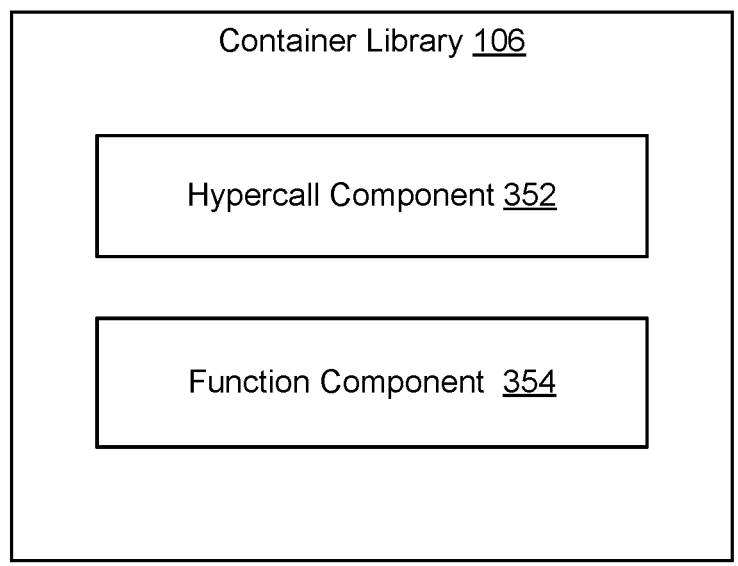
FIG. 3C is a block diagram of an example implementation of the container library of FIG. 2 in accordance with the present disclosure.

Referring now to FIG. 3C, one implementation of example components of the container library 106 are shown. In some implementations, the container library 106 is a runtime library that is implemented as a collection of functions organized in a library. The APIs that the runtime container library 106 provide could be a subset of the POSIX library API. In some implementations, the container library 106 analyzes the linking phase of the specialized containers and identifies shared libraries that are referenced by microservice programs. Therefore, the functions excluded from the container library 106 are functions that are used in the containerized microservice programs. For example, the container library 106 does not include most of the Inter Process Communication primitives, which are not needed because a properly-designed microservice is a single process.

As depicted in FIG. 3C, the runtime container library 106 may include a hypercall component 352 and a function component 354.

The hypercall component 352 is the component of the container library 106 that handles hypercalls. In some implementations, the container library 106 has a number of functions that are thin hypercall wrappers. These functions put the arguments into a generic hypercall argument structure allocated on the stack, and execute the OUT instruction on the I/O port corresponding to the hypercall. A single OUT instruction allows for four bytes of data to be transferred on the port. The runtime function of the container library 106 sends four least significant bytes of the argument structure address in the guest program address space.

The hypercall component 352, or the pseudo device driver that registers the ports corresponding to the pass-through hypercalls as described above, may use these four bytes to reconstruct the address of the argument structure. In some implementations, to reconstruct the address, the hypercall component 352 or the pseudo device driver uses the knowledge that it is on the stack of the current thread and configures that the size of the stack is no more than 4 GB. Other functions in the runtime container library 106 implementations require functionality such as malloc( ) and its friends, memcpy( ) and its friends, string manipulation, standard input/output library functions (stdio), etc.

The function component 354 is responsible for implementing system functions. The function component 354 may implement file system functions in two distinct ways. In some implementations, the function component 354 uses a set of wrappers around regular file system calls, for example, open( ), read( ), lseek( ), pwritev( ), etc. In other implementations, the function component 354 implements file system functions as library functions that access an abstract block device. In some implementations, the block device is presented via pread( ) and pwrite( ) hypercalls accessing real storage. In other implementations, the block device is a block of memory in the guest program space, which is particularly suitable for packaging program configuration files, secrets, or scripts, or serve as intermediate temporary files. It is important to note that in this case a file system request is served entirely inside of the guest program.

In some implementations, the function component 354 achieves payload allocation by simplifying the file system implementation as part of the unikernel 108 itself. In other implementations, when the file system needs to access the block device, the function component 354 communicates with the virtual machine monitor 302 to have the virtual machine 104 to perform some functionality based on the payload, i.e., pass-through system implementation. A pass-through file system implementation is suitable for the cases where a significant size of external storage, e.g., database tables, are required. The function component 354 or its pass-through pseudo driver applies strict access control such that only appropriate files are accessed in an appropriate/allowed way.

Figure 10:
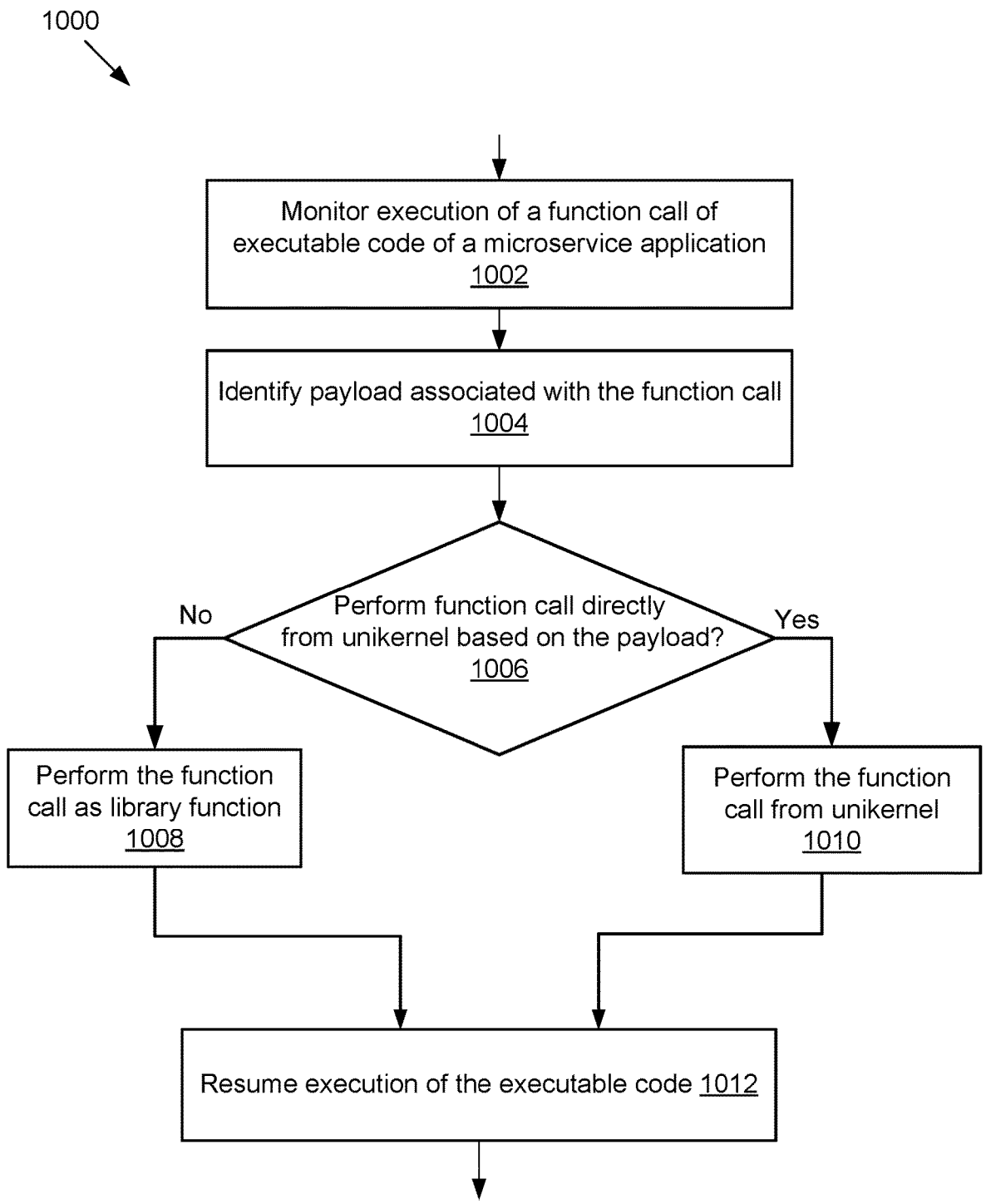
FIG. 10 is a flowchart of an example method for determining the code handled by the virtual machine in accordance with the present disclosure.

FIG. 10 is a flowchart of an example method 1000 for determining the code handled by the virtual machine 104. At step 1002, the function component 354 monitors execution of a function call of executable code of a microservice application. At step 1004, the function component 354 communicates with the virtual may hive monitor 302 to identify a payload associated with the function call. At step 1006, the function component 354 together with the virtual machine monitor 302 determines whether to perform the function call directly from unikernel based on the payload. If in step 106 it is determined not to perform the function call directly, the function component 354 performs 1008 the function call as a library function. If in step 106 it is determined that the function call should be performed directly, the function component 354 performs 1010 the function call directly from unikernel. After either step 1008 or 1010, the virtual machine monitor 302 cooperates with other components of the virtual machine 104 and the container library 106 to resume 1012 the execution of the executable code.

In some implementations, the function component 354 is also used to implement network functionality at a socket level. The network functionality is mostly a pass-through implementation. The function component 354 provides access control and address translation as part of the functionality.

Figure 11:
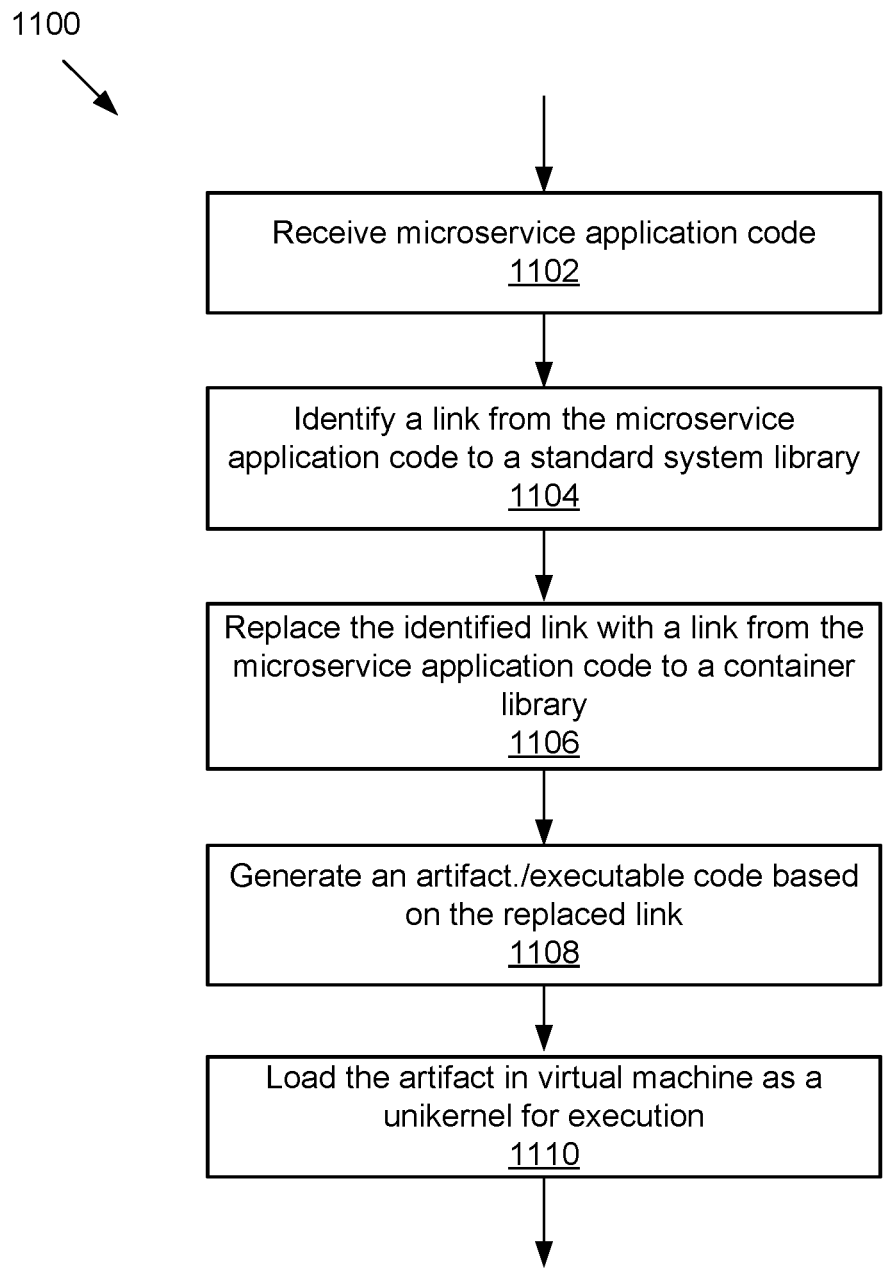
FIG. 11 is a flowchart of an example method for creating an artifact based on static linking in accordance with the present disclosure.

FIG. 11 is a flowchart of an example method 1100 for creating an artifact 154 based on static linking. At step 1102, the virtual machine monitor 302 receives microservice application code. At step 1104, the static linking module 360 identifies a link from the microservice application code to a standard system library, for example, a Linux system library. At step 1106, the static linking module 360 replaces the identified link with a replacement link from the microservice application code to the container library 106. At step 1108, the static linking module 360 generates an artifact 154 that is executable code based on the replacement link. At step 1110, the static linking module 360 is coupled with the virtual machine monitor 302 to load the artifact 154 in the virtual machine 104 as a unikernel 108 for execution.

An alternative to static linking is dynamic linking and loading. This could be challenging because the dynamic linking module 362 creates the artifact 154 after the artifact 154 has been linked by the standard Linux linker. However, dynamic linking is advantageous in that it enables creation of an artifact 154 directly from an existing container, without requiring direct access to microservice object code. Also, dynamic linking is beneficial for large computer systems that run a variety of programs in parallel.

In some implementations, instead of replacing the regular linking stage with container-specific libraries, the dynamic linking module 362 generates a container artifact based on an executable created by the standard Linux linker, which by default is dynamically linked.

A dynamically linked executable created by the standard Linux linker contains all of the guest program code along with relocation data. Normally, the Linux dynamic linker loads the executable in memory and resolves all references to external libraries. Every time a program runs, the Linux dynamic linker determines all the referenced libraries for the program. However, the Linux dynamic linker cannot separate the referenced libraries determined for different programs. Even if there is only a single reference to a library function/program, the Linux dynamic linker would place all the referenced library functions in memory. This is applicable in cases where the library code is shared between multiple processes. But it may be difficult to use the Linux dynamic linker in the container 102 because it is designed to provide rigorous process isolation by wrapping every microservice in the virtual machine 104, and thus there may not be any sharing of code amongst microservices.

The dynamic linking module 362 takes the guest program code and resolves all of the library references using the runtime container library 106. Instead of placing the result in memory for execution, the dynamic linking module 362 may create an ELF image that contains all of the guest program code and all the library functions referenced. Because the dynamic linking module 362 identities individual functions instead of using the entire libraries, the result is as compact as it would have been in static linking.

In some implementations, the execution of linking may be fully dynamic. For example, the dynamic linking module 362 may execute linking every time that the virtual machine 104 launches.

As a result of dynamic linking and loading performed by the dynamic linking module 362, the program executable does not include all the code in the libraries. Instead, the library code is read and loaded into memory in an additional step. In some implementations, the dynamic linking module 362 may load the library code implicitly at initial start, driven by references to the libraries that are embedded in the executable file. Each of the libraries is listed in the ELF entry called DT_NEEDED. In other implementations, the dynamic linking module 362 may load the library code explicitly by using dlopen( ) and dlsym( ) functions.

Despite the advantages of dynamic linking, it is difficult to implement the dynamic linking and loading. On the other hand, static linking well suits the unikernel 108 and container paradigm, but it is not always applicable. For the purpose of microservices, it makes no difference whether the executable code is statically or dynamically linked as long as the same functionality is provided. In practice, sometimes the software products are written in a way that makes it impossible to run them as pure static executables. For example, a Java virtual machine (NM) loads its own parts from a set of shared libraries by explicitly calling dlopen( ). Therefore, source code must be modified in order to generate static executable from JVM. Similarly, for Python external modules that refer to external libraries, the code is also loaded by using explicit calls to dlopen( ), and therefore source code modification is needed to produce a static executable.

In order to run the software packages including JVM and Python as statically linked unikernels 108 without modifying source code, in some implementations, the static & dynamic linking module 364 is used to perform statically linked dynamic linking and loading. This provides an applicable and complexity-tolerable approach, and therefore is preferred. In some implementations, the static & dynamic linking module 364 achieves static dynamic linking and loading because the executable is dynamically linked but it is static and represented in a single ELF.

Note that the above-mentioned examples of JVM and Python are both scripting language cases handled by the script-specific container component 356. The static & dynamic linking module 364 is coupled with the script-specific container component 356 to create a set of specialized containers to perform functionalities using a scripting language.

In some implementations, for a software application that requires dynamic building, the static & dynamic linking module 364 may analyze the linking phase of the building process of the specialized containers and identify the shared libraries that are referenced. The identified libraries include a list of libraries that are referenced by the program. The static & dynamic linking module 364 along with the script-specific container component 356 identifies the object files (.o), the list of libraries and the linker command line that produces the executable, and stores the identified information to create the specialized container.

In some implementations, the static & dynamic linking module 364 creates user-specific artifacts based on analyzing the content of the container and identifying additional shared libraries that could be referenced by the code. The static & dynamic linking module 364 may also add additional shared libraries to the list of shared libraries.

In addition to building specialized containers, the static & dynamic linking module 364 also pre-builds a set of libraries that may be referenced by the code. When the original shared library is being built, the static & dynamic linking module 364 analyzes the building process and collects object files (.o) that are part of the specific library. The static & dynamic linking module 364 analyzes the object files to generate the list of functions that are possible to call in the library. The static & dynamic linking module 364 then uses this list to build a table that maps function names to corresponding addresses. At this point, the addresses are unknown. The static & dynamic linking module 364 fills in a placeholder for each address. The addresses will be supplied when the final unikernel 108 is later linked. In other words, the static & dynamic linking module 364 generates C and .o file to emulate the behavior of the dynamic linker that will be properly relocated during the static link phase.

The static & dynamic linking module 364 uses the addresses on runtime to emulate dlsym( ) calls, without assistance from a dynamic loader.

The names of some functions may conflict between different libraries. In some implementations, the static & dynamic linking module 364 may use an init( ) function in each library to avoid this conflict. However, since there is no way to know in advance which libraries will be used for the final unikernel 108, the static & dynamic linking module 364 may manipulate the function names to avoid name collision. To manipulate, the static & dynamic linking module 364 adds a unique hash string, e.g., a hash of the library, to the names so that the table has an original function name, a manipulated name, and a placeholder for the address.

The static & dynamic linking module 364 constructs the unikernel 108 by linking together program object files, object files for all the identified libraries (with the manipulated function names), and the dlopen( ) and dlsym( ) functions. The static & dynamic linking module 364 also builds and links a table of names of the libraries that are linked into the unikernel. The static & dynamic linking module 364 updates the placeholders for library function addresses with the real addresses of the function as they are placed in the executable image.

The static & dynamic linking module 364 implements its own version of dlopen( ) and dlsym( ) functions. Specifically, when the static & dynamic linking module 364 determines that a program calls dlopen( ) and dlsym( ) the dlopen( ) function only checks if the requested library is in the statically linked executable by searching it in the table of libraries, while dlsym( ) uses the per-library table of functions that was built during the preparation of the library to search for the requested function and return its address from the table. The static & dynamic linking module 364 allows the calling code to use the address rather than the function name, such that manipulation the names would not affect the operation.

Figure 12:
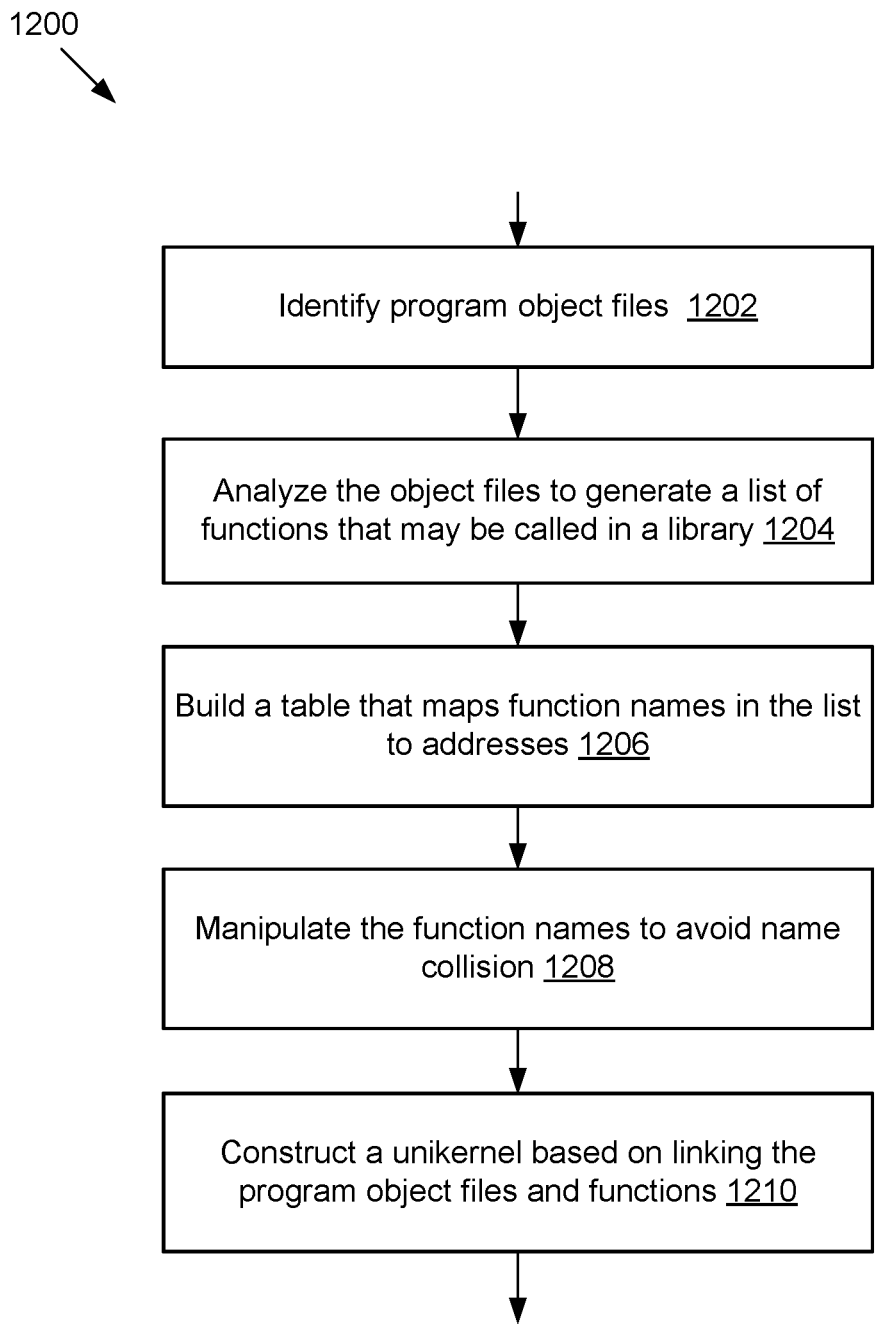
FIG. 12 is a flowchart of an example method for building a set of libraries that may be referenced in accordance with the present disclosure.

FIG. 12 is a flowchart of an example method 1200 for building a set of libraries that may be referenced. At step 1202, the static & dynamic linking module 364 identifies program object files. At step 1204, the static & dynamic linking module 364 analyzes the object files to generate a list of functions that may be called in a library. At step 1206, the static & dynamic linking module 364 builds a table that maps function names in the list to addresses. At step 1208, the static & dynamic linking module 364 manipulates the function names to avoid name collision. At step 1210, the static & dynamic linking module 364 constructs a unikernel based on linking the program object files and functions.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, DVDs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RSPP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, VAS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   creating, by one or more processors, a dynamically configurable virtual machine including a first virtual central processing unit (CPU);
   receiving, by the one or more processors, microservice application code;
   linking, by the one or more processors, the microservice application code to generate executable code;
   determining and assigning, by the one or more processors, memory in the dynamically configurable virtual machine for executing the executable code;
   adapting the dynamically configurable virtual machine by adding an artifact that executes natively on the dynamically configurable virtual machine, does not require a traditional operating system kernel, and performs all the functions required by the executable code;
   executing the executable code using the dynamically configurable virtual machine;
   determining whether the dynamically configurable virtual machine requires reconfiguration including determining whether the virtual machine needs more CPU power; and
   activating an additional virtual CPU responsive to determining that the virtual machine needs more CPU power; wherein activating the additional virtual CPU includes determining whether an inactive virtual CPU is available;
      preparing and activating the inactive virtual CPU as a replacement virtual CPU if it is determined that the inactive virtual CPU is available;
      creating the additional virtual CPU if it is determined that no inactive virtual CPU is available;
      configuring a page map level 4 hierarchy for the additional virtual CPU; and
      configuring a stack for the additional virtual CPU; and
   performing reconfiguration of the dynamically configurable virtual machine responsive to determining that the virtual machine requires reconfiguration.

2. The method of claim 1, wherein the reconfiguration is performed on demand.

3. The method of claim 2, wherein on demand is responsive to execution of the executable code by the dynamically configurable virtual machine.

4. The method of claim 1, wherein linking the microservice application code to generate the executable code comprises includes linking the microservice application code to a container library by:
   identifying a link from the microservice application code to a standard system library;
   replacing the identified link with a replacement link from the microservice application code to the container library; and
   generating the executable code based on the replacement link.

5. The method of claim 1, wherein determining whether the dynamically configurable virtual machine requires reconfiguration includes determining whether the virtual machine needs less CPU power, and the method further comprises deactivating an additional virtual CPU responsive to determining that the virtual machine needs less CPU power.

6. The method of claim 5, wherein deactivating the additional virtual CPU comprises:
   marking the additional virtual CPU associated with a thread as inactive; and
   placing the thread in a sleep status waiting for possible future re-activation in an event of a future need for an additional virtual CPU.

7. The method of claim 1, wherein determining whether the dynamically configurable virtual machine requires reconfiguration includes determining whether the virtual machine needs more memory, and the method further comprises allocating additional memory responsive to determining that the virtual machine needs more memory.

8. The method of claim 7, wherein the allocating the additional memory comprises:
determining a size of memory needed for executing the executable code; and
adding the additional memory to the virtual machine by linearly mapping a number of virtual addressees to a number of physical addresses based on the determined size of memory needed for executing the executable code.

9. The method of claim 7, wherein determining whether the dynamically configurable virtual machine requires reconfiguration includes determining whether the virtual machine needs less memory, and the method further comprises deallocating a portion of the additional memory responsive to determining that the virtual machine needs less memory.

10. The method of claim 9, wherein deallocating the memory comprises:
determining the additional memory allocated for the execution of the executable code by identifying linear mappings to physical addresses; and
deallocating the additional memory used by the executable code from the virtual machine by removing the linear mappings.

11. The method of claim 1, further comprising:
determining whether the executable code invokes a hypercall; and
responsive to determining that the executable code invokes a hypercall, decoding one or more parameters of the hypercall;
performing the hypercall with the virtual machine based on the one or more parameters; and
resuming the execution of the executable code.

12. The method of claim 1, further comprising:
identifying program object files;
analyzing the object files to generate a list of function names that may be called in the course of executing the executable code;
building a table that maps function names in the list to addresses; and
constructing the container library based on linking the program object files and function names.

13. A container comprising:
a first container library including a collection of library functions; and
a first dynamically configurable virtual machine having a first virtual CPU and memory, the first dynamically configurable virtual machine coupled to access the first library container, the first dynamically configurable virtual machine adapted to run executable code and determine whether reconfiguration is required from executing the executable code including determining whether the virtual machine needs more CPU power, the first dynamically configurable virtual machine adapted by adding an artifact that executes natively on the dynamically configurable virtual machine, does not require a traditional operating system kernel, and performs the functions required by the executable code, the first dynamically configurable virtual machine adapted to activating an additional virtual CPU responsive to determining that the virtual machine needs more CPU power wherein activating the additional virtual CPU includes determining whether an inactive virtual CPU is available, preparing and activating the inactive virtual CPU as a replacement virtual CPU if it is determined that the inactive virtual CPU is available, creating the additional virtual CPU if it is determined that no inactive virtual CPU is available, configuring a page map level 4 hierarchy for the additional virtual CPU; and configuring a stack for the additional virtual CPU.

14. The container of claim 13, wherein the first dynamically configurable virtual machine is reconfigured on demand responsive to determining reconfiguration is required.

15. The container of claim 13, wherein the first container library is coupled to receive microservice application code, and the first container library includes an artifact creation component to create the executable code from the microservice application code and the first container library.

16. The container of claim 15, wherein the artifact creation component to creates the executable code using unmodified existing object code of the microservice application.

17. The container of claim 13, wherein the first container library includes a function component that includes only those file system functions in the executable code.

18. The container of claim 13, wherein the first container library includes a hypercall component and the first dynamically configurable virtual machine includes a hypercall communication module to allow a hypercall to be performed directly from a kernel.

19. The container of claim 13, wherein the first container library includes a script-specific component that allows the first dynamically configurable virtual machine implement functionalities of a scripting language.

20. The container of claim 13, wherein the first dynamically configurable virtual machine comprises a virtual machine monitor for monitoring execution of code by the first dynamically configurable virtual machine, and controlling reconfiguration of the first dynamically configurable virtual machine.

21. The container of claim 13, wherein the first dynamically configurable virtual machine comprises a memory management module for allocating memory on demand, the memory management module responsive to a request for additional memory from a virtual machine monitor.

22. The container of claim 13, wherein, the first dynamically configurable virtual machine comprises a virtual CPU management module for creating and initializing an additional virtual CPU responsive to a request for an additional virtual CPU from a virtual machine monitor.

23. The container of claim 13, further comprising:
an additional container library including an additional collection of library functions; and
an additional dynamically configurable virtual machine having an additional virtual CPU and coupled to the memory, the additional dynamically configurable virtual machine coupled to access the additional library container, the additional dynamically configurable virtual machine adapted to run other executable code and determine whether reconfiguration of the additional dynamically configurable virtual machine is required from executing the other executable code.

* * * * *